US006999295B2

(12) United States Patent
Watkins, III et al.

(10) Patent No.: US 6,999,295 B2
(45) Date of Patent: Feb. 14, 2006

(54) DUAL OPERATING MODE ELECTRONIC DISABLING DEVICE FOR GENERATING A TIME-SEQUENCED, SHAPED VOLTAGE OUTPUT WAVEFORM

(76) Inventors: Thomas G. Watkins, III, 5330 E. Palomino Rd., Phoenix, AZ (US) 85018; Magne Nerheim, 7033 E. Joan De Arc, Scottsdale, AZ (US) 85254

( * ) Notice: Subject to any disclaimer, the term of this patent is extended or adjusted under 35 U.S.C. 154(b) by 0 days.

(21) Appl. No.: 11/051,877

(22) Filed: Feb. 5, 2005

(65) Prior Publication Data

US 2005/0188888 A1 Sep. 1, 2005

Related U.S. Application Data

(63) Continuation of application No. 10/447,447, filed on May 29, 2003, which is a continuation-in-part of application No. 10/364,164, filed on Feb. 11, 2003.

(51) Int. Cl.
*H02H 23/00* (2006.01)

(52) U.S. Cl. ........................................ 361/232

(58) Field of Classification Search ................ 361/232
See application file for complete search history.

(56) References Cited

U.S. PATENT DOCUMENTS

| | | | |
|---|---|---|---|
| 2,805,067 | A | 9/1957 | Ryan |
| 3,523,538 | A | 8/1970 | Shimizu |
| 3,626,626 | A | 12/1971 | Blanc |
| 3,717,802 | A | 2/1973 | Plevy et al. |
| 3,803,463 | A | 4/1974 | Cover |
| 3,819,108 | A | 6/1974 | Jordon |
| 4,092,695 | A | 5/1978 | Henderson et al. |
| 4,162,515 | A | 7/1979 | Henderson et al. |
| 4,167,036 | A | 9/1979 | Kenney |
| 4,242,715 | A | 12/1980 | Laird |
| 4,253,132 | A | 2/1981 | Cover |
| 4,370,696 | A | 1/1983 | Darrell |
| 4,486,807 | A | 12/1984 | Yanez |
| 4,539,937 | A | 9/1985 | Workman |
| 4,541,191 | A | 9/1985 | Morris et al. |
| 4,688,140 | A | 8/1987 | Hammes |
| 4,691,264 | A | 9/1987 | Schaffhauser et al. |
| 4,755,723 | A | 7/1988 | Sikora |
| 4,843,336 | A | 6/1989 | Kuo |
| 4,846,044 | A | 7/1989 | Lahr |

(Continued)

OTHER PUBLICATIONS

"Stun Guns—An Independent Report," T'Prina Technology, 1994, published by T'Prina Technology, Gateway Station, Aurora, CO 80044-1126 USA.

*Primary Examiner*—Stephen W. Jackson

(57) ABSTRACT

An electronic disabling device includes first and second electrodes positionable to establish first and second spaced apart contact points on a target having a high impedance air gap existing between at least one of the electrodes and the target. The power supply generates a first high voltage, short duration output across the first and second electrodes during a first time interval to ionize air within the air gap to thereby reduce the high impedance across the air gap to a lower impedance to enable current flow across the air gap at a lower voltage level. The power supply next generates a second lower voltage, longer duration output across the first and second electrodes during a second time interval to maintain the current flow across the first and second electrodes and between the first and second contact points on the target to enable the current flow through the target to cause involuntary muscle contractions to thereby immobilize the target.

40 Claims, 21 Drawing Sheets

U.S. PATENT DOCUMENTS 4,872,084 A 10/1989 Dunning et al.
4,900,990 A 2/1990 Sikora
4,949,017 A 8/1990 Sikora
5,060,131 A 10/1991 Sikora
5,078,117 A 1/1992 Cover
5,193,048 A 3/1993 Kaufman
5,225,623 A 7/1993 Krasnow
5,282,332 A 2/1994 Philips
5,388,603 A 2/1995 Bauer et al.
5,467,247 A 11/1995 de Anda et al.
5,471,362 A * 11/1995 Gowan ....................... 361/257
5,473,501 A 12/1995 Claypool
5,519,389 A 5/1996 DeGunther
5,523,654 A 6/1996 Sikora
5,619,402 A 4/1997 Liu
5,625,525 A 4/1997 Coakley et al.
5,654,868 A * 8/1997 Buer .......................... 361/256
5,698,815 A 12/1997 Ragner
5,962,806 A 10/1999 Coakley et al.
5,973,477 A 10/1999 Chang
6,022,120 A 2/2000 Chang
6,204,476 B1 * 3/2001 Reynolds et al. ...... 219/130.51
6,404,613 B1 6/2002 Dowling
6,636,412 B1 10/2003 Smith
6,877,434 B1 * 4/2005 McNulty, Jr. ............... 102/502

* cited by examiner

First Time Interval

Second Time Interval

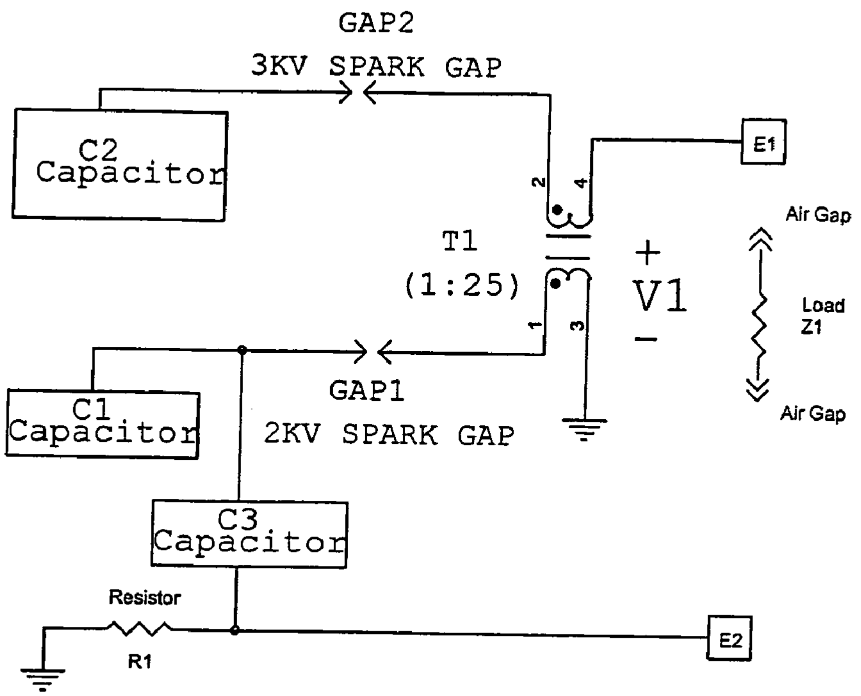
Figure 15
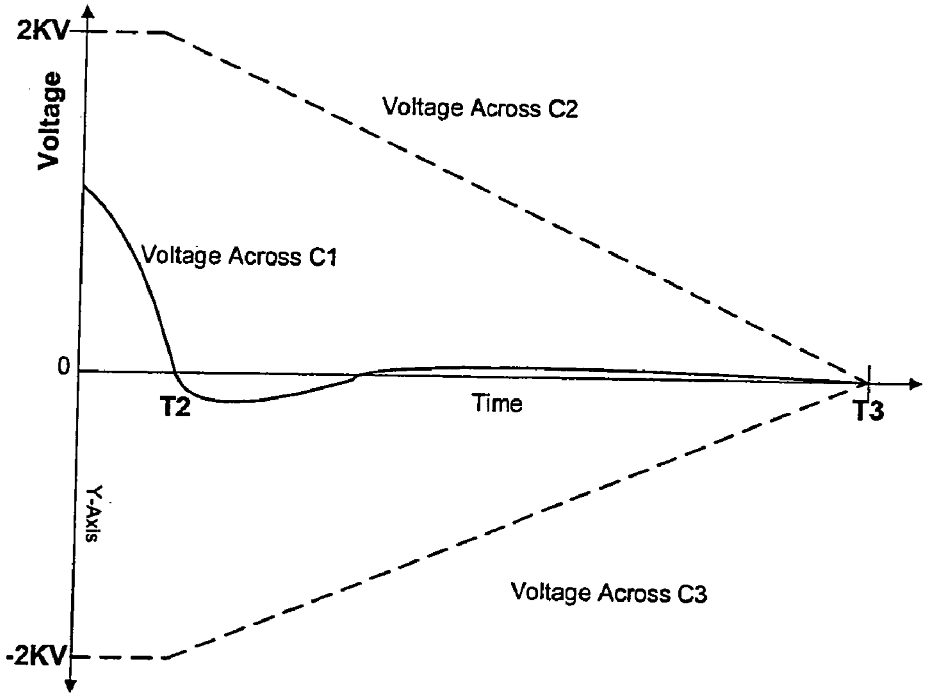
Figure 16 Voltage across C1, C2 and C3 during T2 to T3

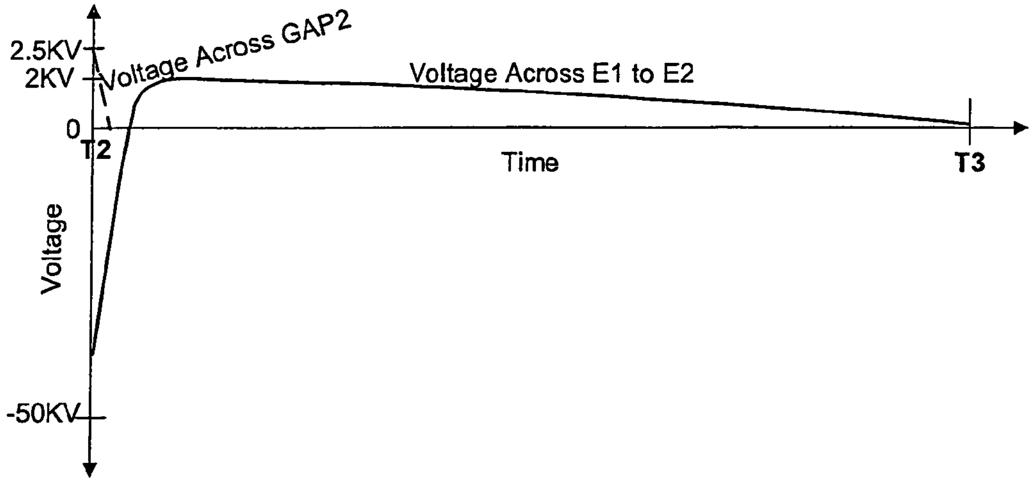
Figure 17 Voltage across GAP2 and load (E1 to E2) during T2 to T3
| Interval Number | TIME | GAP1 | GAP 2 |
|---|---|---|---|
| 1 | $T_0 - T_1$ | OFF | OFF |
| 2 | $T1 - T_{2'}$ | ON | OFF |
| 3 | $T_2 - T_3$ | OFF | ON |
| 4 | $T_3 - T_4$ | OFF | OFF |
Figure 18 SPARK Gap On/OFF Timing
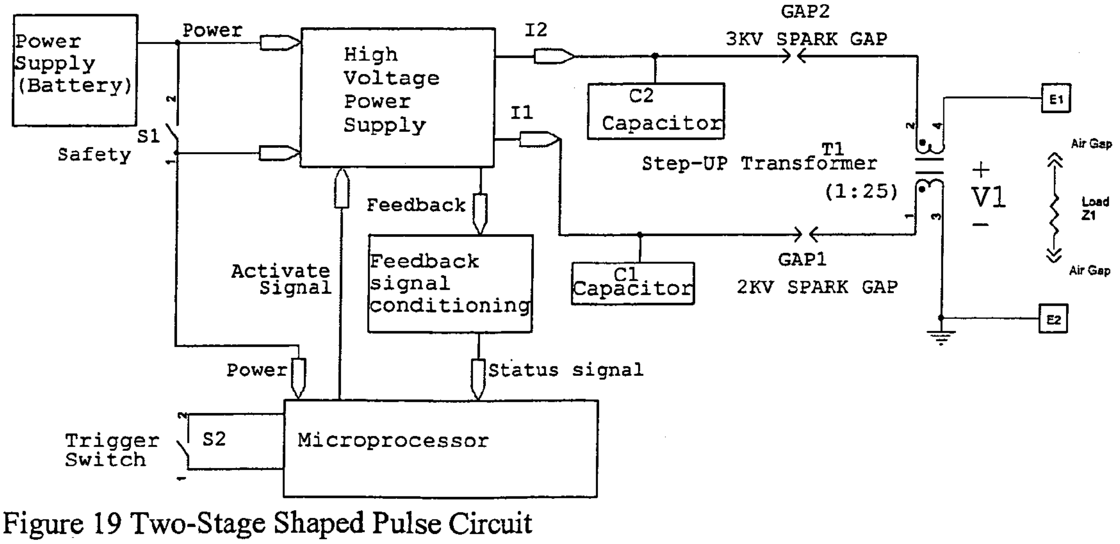
Figure 19 Two-Stage Shaped Pulse Circuit

| Temp [°C] | Pulse PWR [uAHRs/Pulse] | Laser [uAHrs/Sec] | Flashlight [uAHrs/Sec] | Clock [uAHrs/24Hrs] | Microp. [uAHrs/Sec] |
|---|---|---|---|---|---|
| -20 | 2104 | 19 | 64 | 350 | 4 |
| -19 | 2042 | 18.8 | 63.45 | 349 | 4 |
| -18 | 1980 | 18.6 | 62.9 | 348 | 4 |
| -17 | 1918 | 18.4 | 62.35 | 347 | 4 |
| -16 | 1856 | 18.2 | 61.8 | 346 | 4 |
| -15 | 1794 | 18 | 61.25 | 345 | 4 |
| -14 | 1732 | 17.8 | 60.7 | 344 | 4 |
| -13 | 1670 | 17.6 | 60.15 | 343 | 4 |
| -12 | 1608 | 17.4 | 59.6 | 342 | 4 |
| -11 | 1546 | 17.2 | 59.05 | 341 | 4 |
| -10 | 1484 | 17 | 58.5 | 340 | 4 |
| -9 | 1431 | 16.8 | 57.95 | 339 | 4 |
| -8 | 1378 | 16.6 | 57.4 | 338 | 4 |

Figure 27

DUAL OPERATING MODE ELECTRONIC DISABLING DEVICE FOR GENERATING A TIME-SEQUENCED, SHAPED VOLTAGE OUTPUT WAVEFORM

BACKGROUND OF THE INVENTION

1. Field of the Invention

The present invention relates to electronic disabling devices, and more particularly, to electronic disabling devices which generate a time-sequenced, shaped voltage waveform output signal. This is a Continuation patent application of U.S. patent application Ser. No. 10/447,447, filed May 29, 2003, entitled "A Dual Operating Mode Electronic Disabling Device for Generating A Time-Sequenced, Shaped Voltage Output Waveform," which is a Continuation-in-Part of U.S. patent application Ser. No. 10/364,164, filed Feb. 11, 2003, entitled "A Dual Operating Mode Electronic Disabling Device for Generating A Time-Sequenced, Shaped Voltage Output Waveform."

2. Description of the Prior Art

The original stun gun was invented in the 1960's by Jack Cover. Such prior art stun guns incapacitated a target by delivering a sequence of high voltage pulses into the skin of a subject such that the current flow through the subject essentially "short-circuited" the target's neuromuscular system causing a stun effect in lower power systems and involuntary muscle contractions in more powerful systems. Stun guns, or electronic disabling devices, have been made in two primary configurations. A first stun gun design requires the user to establish direct contact between the first and second stun gun output electrodes and the target. A second stun gun design operates on a remote target by launching a pair of darts which typically incorporate barbed pointed ends. The darts either indirectly engage the clothing worn by a target or directly engage the target by causing the barbs to penetrate the target's skin. In most cases, a high impedance air gap exists between one or both of the first and second stun gun electrodes and the skin of the target because one or both of the electrodes contact the target's clothing rather than establishing a direct, low impedance contact point with the target's skin.

One of the most advanced existing stun guns incorporates the circuit concept illustrated in the FIG. 1 schematic diagram. Closing safety switch S1 connects the battery power supply to a microprocessor circuit and places the stun gun in the "armed" and ready to fire configuration. Subsequent closure of the trigger switch S2 causes the microprocessor to activate the power supply which generates a pulsed voltage output on the order of two thousand volts which is coupled to charge an energy storage capacitor up to the two thousand volt power supply output voltage. Spark gap "GAP1" periodically breaks down, causing a high current pulse through transformer T1 which transforms the two thousand volt input into a fifty thousand volt output pulse.

Taser International of Scottsdale, Ariz., the assignee of the present invention, has for several years manufactured sophisticated stun guns of the type illustrated in the FIG. 1 block diagram designated as the Taser® Model M18 and Model M26 stun guns. High power stun guns such as these Taser International products typically incorporate an energy storage capacitor having a capacitance rating of from 0.2 microfarads at two thousand volts on a light duty weapon-up to 0.88 microFarads at two thousand volts as used on the Taser M18 and M26 stun guns.

After the trigger switch S2 is closed, the high voltage power supply begins charging the energy storage capacitor up to the two thousand volt power supply peak output voltage. When the power supply output voltage reaches the two thousand voltage spark gap breakdown voltage. A spark is generated across the spark gap designated as "GAP1." Ionization of the spark gap reduces the spark gap impedance from a near infinite impedance level to a near zero impedance and allows the energy storage capacitor to almost fully discharge through step up transformer T1. As the output voltage of the energy storage capacitor rapidly decreases from the original two thousand volt level to a much lower level, the current flow through the spark gap decreases toward zero causing the spark gap to deionize and to resume its open circuit configuration with a near infinite impedance. This "reopening" of the spark gap defines the end of the first fifty thousand volt output pulse which is applied to output electrodes designated in FIG. 1 as "E1" and "E2." A typical stun gun of the type illustrated in the FIG. 1 circuit diagram produces from five to twenty pulses per second.

Because a stun gun designer must assume that a target may be wearing an item of clothing such as a leather or cloth jacket which functions to establish a one quarter inch to one inch air gap between stun gun electrodes E1 and E2 and the target's skin, stun guns have been required to generate fifty thousand volt output pulses because this extreme voltage level is capable of establishing an arc across the high impedance air gap which may be presented between the stun gun output electrodes E1 and E2 and the target's skin. As soon as this electrical arc has been established, the near infinite impedance across the air gap is promptly reduced to a very low impedance level which allows current to flow between the spaced apart stun gun output electrodes E1 and E2 and through the target's skin and intervening tissue regions. By generating a significant current flow within the target across the spaced apart stun gun output electrodes, the stun gun essentially short circuits the target's electromuscular control system and induces severe muscular contractions. With high power stun guns, such as the Taser M18 and M26 stun guns, the magnitude of the current flow across the spaced apart stun gun output electrodes causes numerous groups of skeletal muscles to rigidly contract. By causing high force level skeletal muscle contractions, the stun gun causes the target to lose its ability to maintain an erect, balanced posture. As a result, the target falls to the ground and is incapacitated.

The "M26" designation of the Taser stun gun reflects the fact that, when operated, the Taser M26 stun gun delivers twenty-six watts of output power as measured at the output capacitor. Due to the high voltage power supply inefficiencies, the battery input power is around thirty-five watts at a pulse rate of fifteen pulses per second. Due to the requirement to generate a high voltage, high power output signal, the Taser M26 stun gun requires a relatively large and relatively heavy eight AA cell battery pack. In addition, the M26 power generating solid state components, its energy storage capacitor, step up transformer and related parts must function either in a high current relatively high voltage mode (two thousand volts) or be able to withstand repeated exposure to fifty thousand volt output pulses.

At somewhere around fifty thousand volts, the M26 stun gun air gap between output electrodes E1 and E2 breaks down, the air is ionized, a blue electric arc forms between the electrodes and current begins flowing between electrodes E1 and E2. As soon as stun gun output terminals E1 and E2 are presented with a relatively low impedance load instead of the high impedance air gap, the stun gun output voltage will drop to a significantly lower voltage level. For example, with a human target and with about a ten inch probe to probe separation, the output voltage of a Taser Model M26 might drop from an initial high level of fifty-five thousand volts to a voltage on the order of about five thousand volts. This rapid voltage drop phenomenon with even the most advanced conventional stun guns results because such stun guns are tuned to operate in only a single mode to consistently create an electrical arc across a very high, near infinite impedance air gap. Once the stun gun output electrodes actually form a direct low impedance circuit across the spark gap, the effective stun gun load impedance decreases to the target impedance-typically a level on the order of one thousand Ohms or less. A typical human subject frequently presents a load impedance on the order of about two hundred Ohms.

Conventional stun guns have by necessity been designed to have the capability of causing voltage breakdown across a very high impedance air gap. As a result, such stun guns have been designed to produce a fifty thousand to sixty thousand volt output. Once the air gap has been ionized and the air gap impedance has been reduced to a very low level, the stun gun, which has by necessity been designed to have the capability of ionizing an air gap, must now continue operating in the same mode while delivering current flow or charge across the skin of a now very low impedance target. The resulting high power, high voltage stun gun circuit operates relatively inefficiently yielding low electro-muscular efficiency and with high battery power requirements.

SUMMARY OF THE INVENTION

Briefly stated, and in accord with one embodiment of the invention, an electronic disabling device includes first and second electrodes positioned to establish first and second spaced apart contact points on a target wherein a high impedance air gap may exist between at least one of the electrodes and the target. The electronic disabling device includes a power supply for generating a first high voltage, short duration output across the first and second electrodes during the first time interval to ionize the air within the air gap to thereby reduce the high impedance across the air gap to a lower impedance to enable current flow across the air gap at a lower voltage level and for subsequently generating a second lower voltage, longer duration output across the first and second electrodes during a second time interval to maintain the current flow across the first and second electrodes and between the first and second contact points on the target to enable the current flow through the target to cause involuntary muscle contractions to thereby immobilize the target.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 15 represents a schematic diagram of the active components of the FIG. 10 circuit during time interval T2 to T3.

FIG. 16 illustrates the voltages across capacitors C1, C2 and C3 during time interval T2 to T3.

FIG. 17 illustrates the voltage levels across Gap 2 and E1 to E2 during time interval T2 to T3.

FIG. 18 represents a chart indicating the effective impedance level of GAP1 and GAP 2 during the various time intervals relevant to the operation of the present invention.

FIG. 19 represents an alternative embodiment of the invention which includes only a pair of output capacitors C1 and C2.

FIG. 27 represents a battery consumption table.

DESCRIPTION OF THE PREFERRED EMBODIMENT

In order to better illustrate the advantages of the invention and its contributions to the art, a preferred embodiment of the invention will now be described in detail.

Figure 2:
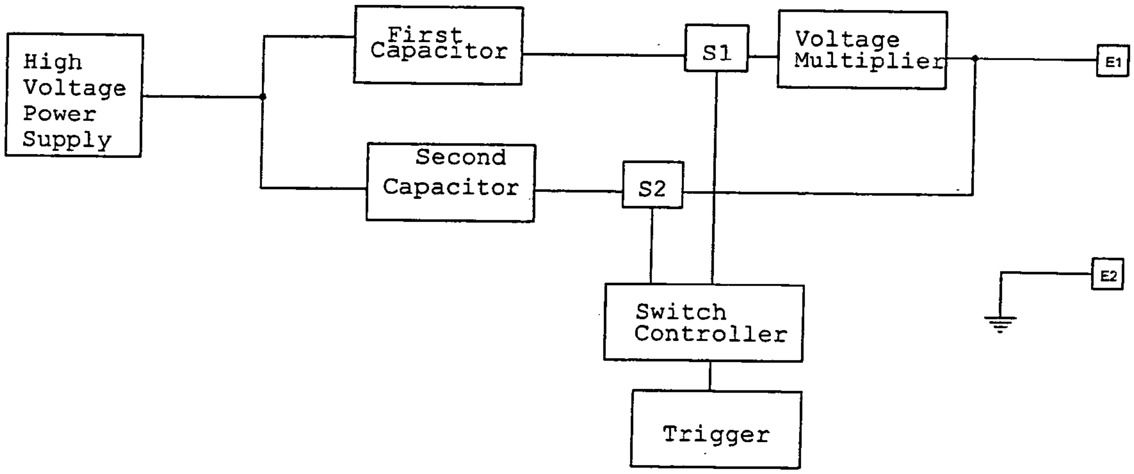
FIG. 2 represents a block diagram illustration of one embodiment of the present invention.

Referring now to FIG. 2, an electronic disabling device for immobilizing a target according to the present invention includes a power supply, first and second energy storage capacitors, and switches S1 and S2 which operate as single pole, single throw switches and serve to selectively connect the two energy storage capacitors to down stream circuit elements. The first energy storage capacitor is selectively connected by switch S1 to a voltage multiplier which is coupled to first and second stun gun output electrodes designated E1 and E2. The first leads of the first and second energy storage capacitors are connected in parallel with the power supply output. The second leads of each capacitor are connected to ground to thereby establish an electrical connection with the grounded output electrode E2.

The stun gun trigger controls a switch controller which controls the timing and closure of switches S1 and S2.

Referring now to FIGS. 3–8 and FIG. 12, the power supply is activated at time T0. The energy storage capacitor charging takes place during time interval T0–T1 as illustrated in FIGS. 12A and 12B.

At time T1, switch controller closes switch S1 which couples the output of the first energy storage capacitor to the voltage multiplier. The FIG. 3B and FIG. 6 voltage versus time graphs illustrate that the voltage multiplier output rapidly builds from a zero voltage level to a level indicated in the FIG. 3B and FIG. 6 graphics as "$V_{HIGH}$."

Figure 5A:
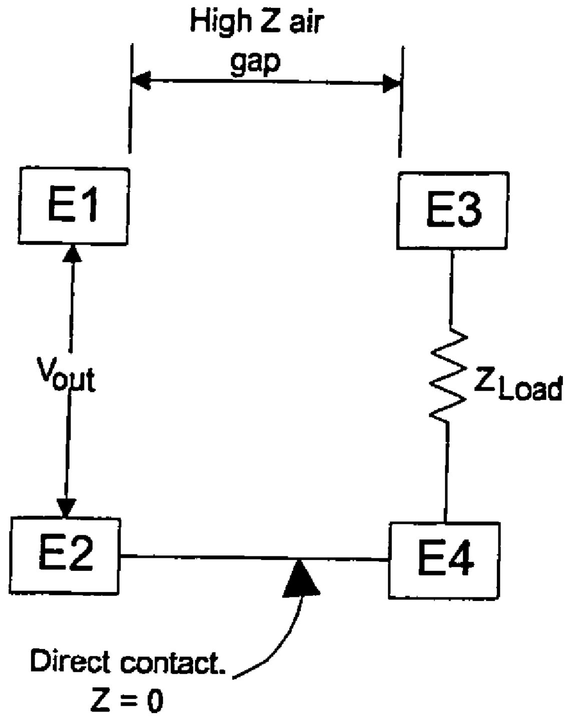
FIG. 5A illustrates a high impedance air gap which may exist between one of the electronic disabling device output electrodes and spaced apart locations on a target illustrated by the designations "E3," "E4," and an intervening load $Z_{LOAD}$.
Figure 5B:
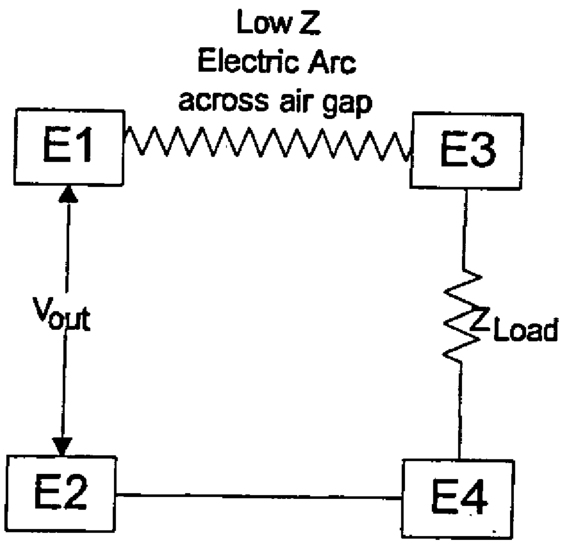
FIG. 5B illustrates the circuit elements shown in FIG. 5A after an electric spark has been created across electrodes E1 and E2 which produces an ionized, low impedance path across the air gap.

In the hypothetical situation illustrated in FIG. 5A, a high impedance air gap exists between stun gun output electrode E1 and target contact point E3. The FIG. 5A diagram illustrates the hypothetical situation where a direct contact (i.e., impedance E2–E4 equals zero) has been established between stun gun electrical output terminal E2 and the second spaced apart contact point E4 on a human target. The E1 to E2 on the target spacing is assumed to equal on the order of ten inches. The resistor symbol and the symbol $Z_{LOAD}$ represents the internal target resistance which is typically less than one thousand Ohms and approximates 200 Ohms for a typical human target.

Application of the $V_{HIGH}$ voltage multiplied output across the E1 to E3 high impedance air gap forms an electrical arc having ionized air within the air gap. The FIG. 5C timing diagram illustrates that after a predetermined time during the T1 to T2 high voltage waveform output interval, the air gap impedance drops from a near infinite level to a near zero level. This second air gap configuration is illustrated in the FIG. 5B drawing.

Once this low impedance ionized path has been established by the short duration application of the $V_{HIGH}$ output signal which resulted from the discharge of the first energy storage capacitor through the voltage multiplier, the switch controller opens switch S1 and closes switch S2 to directly connect the second energy storage capacitor across the electronic disabling device output electrodes E1 and E2. The circuit configuration for this second time interval is illustrated in the FIG. 4A block diagram. As illustrated in the FIG. 4B voltage waveform output diagram, the relatively low voltage $V_{LOW}$ derived from the second output capacitor is now directly connected across the stun gun output terminals E1 and E2. Because the ionization of the air gap during time interval T1 to T2 dropped the air gap impedance to a low level, application of the relatively low second capacitor voltage "$V_{LOW}$" across the E1 to E3 air gap during time interval T2 to T3 will allow the second energy storage capacitor to continue and maintain the previously initiated discharge across the arced-over air gap for a significant additional time interval. This continuing, lower voltage discharge of the second capacitor during the interval T2 to T3 transfers a substantial amount of target-incapacitating electrical charge through the target.

As illustrated in FIGS. 4B 5C, 6 and 8, the continuing discharge of the second capacitor through the target will exhaust the charge stored in the capacitor and will ultimately cause the output voltage from the second capacitor to drop to a voltage level at which the ionization within the air gap will revert to the non-ionized, high impedance state causing cessation of current flow through the target.

In the FIG. 2 block diagram, the switch controller can be programmed to close switch S1 for a predetermined period of time and then to close switch S2 for a predetermined period of time to control the T1 to T2 first capacitor discharge interval and the T2 to T3 second capacitor discharge interval.

During the T3 to T4 interval, the power supply will be disabled to maintain a factory present pulse repetition rate. As illustrated in the FIG. 8 timing diagram, this factory present pulse repetition rate defines the overall T0 to T4 time interval. A timing control circuit potentially implemented by a microprocessor maintains switches S1 and S2 in the open condition during the T3 to T4 time interval and disables the power supply until the desired T0 to T4 time interval has been completed. At time T0, the power supply will be reactivated to recharge the first and second capacitors to the power supply output voltage.

Figure 9:
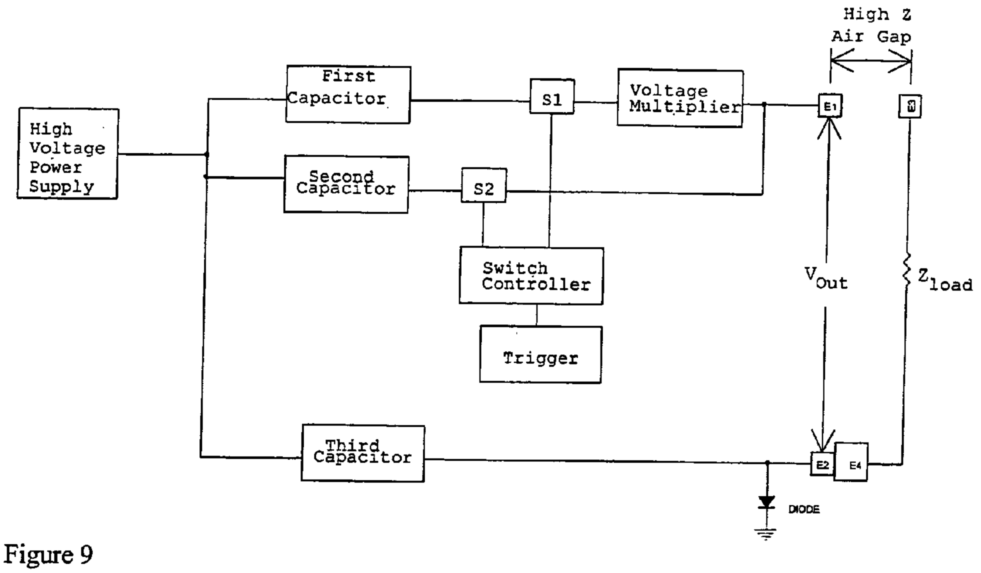
FIG. 9 represents a block diagram illustration of a more complex version of the FIG. 2 circuit where the FIG. 9 circuit includes a third capacitor.

Referring now to the FIG. 9 schematic diagram, the FIG. 2 circuit has been modified to include a third capacitor and a load diode (or resistor) connected as shown. The operation of this enhanced circuit diagram will be explained below in connection with FIG. 10 and the related more detailed schematic diagrams.

Figure 10:
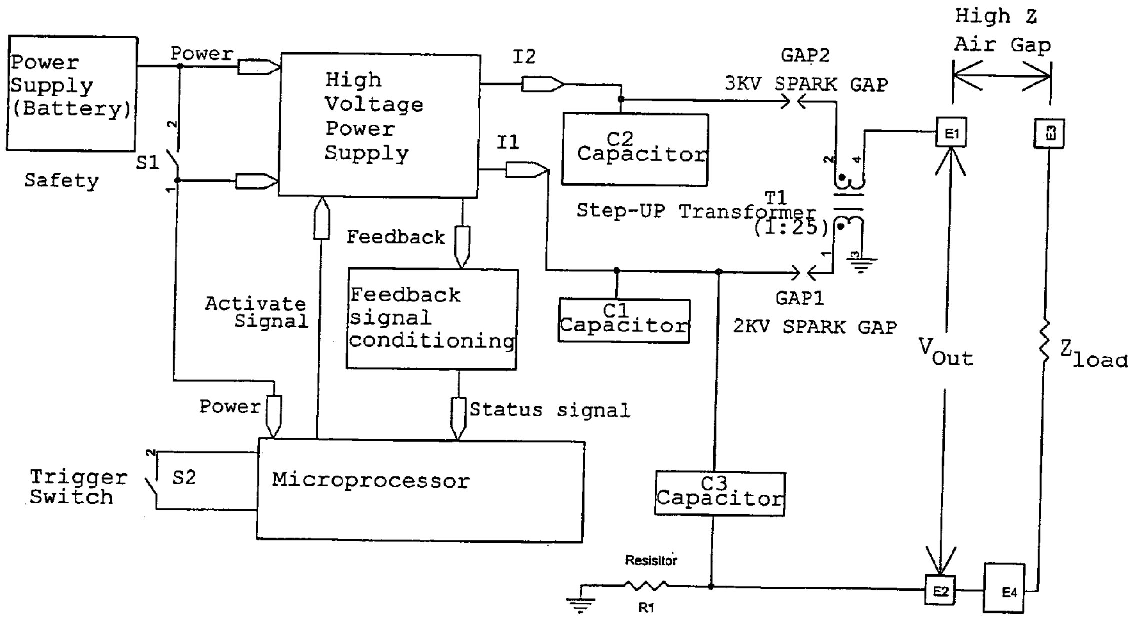
FIG. 10 represents a more detailed schematic diagram of the FIG. 9 circuit.

Referring now to the FIG. 10 electrical schematic diagram, the high voltage power supply generates an output current I1 which charges capacitors C1 and C3 in parallel. While the second terminal of capacitor C2 is connected to ground, the second terminal of capacitor C3 is connected to ground through a relatively low resistance load resistor R1 or as illustrated in FIG. 9 by a diode. The first voltage output of the high voltage power supply is also connected to a two thousand volt spark gap designated as "GAP1" and to the primary winding of an output transformer having a one to twenty-five primary to secondary winding step up ratio.

The second equal voltage output of the high voltage power supply is connected to one terminal of capacitor C2 while the second capacitor terminal is connected to ground. The second power supply output terminal is also connected to a three thousand volt spark gap designated GAP2. The second side of spark gap GAP2 is connected in series with the secondary winding of transformer T1 and to stun gun output terminal E1.

In the FIG. 10 circuit, closure of safety switch S1 enables operation of the high voltage power supply and places the stun gun into a standby/ready to operate configuration. Closure of the trigger switch designated S2 causes the microprocessor to send a control signal to the high voltage power supply which activates the high voltage power supply and causes it to initiate current flow I1 into capacitors C1 and C3 and current flow I2 into capacitor C2. This capacitor charging time interval will now be explained in connection with the simplified FIG. 11 block diagram and in connection with the FIG. 12A and FIG. 12B voltage versus time graphs.

Figure 11:
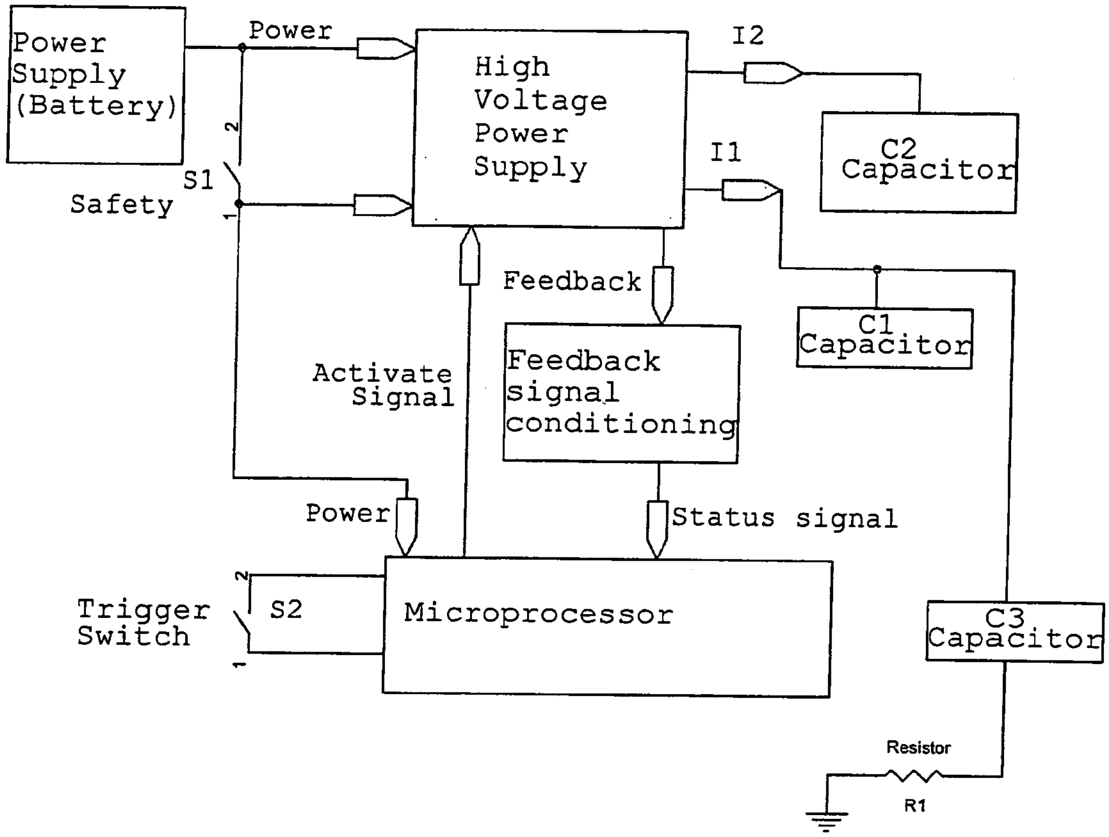
FIG. 11 represents a simplified block diagram of the FIG. 10 circuit showing the active components during time interval $T_0$ to $T_1$.
Figure 12A:
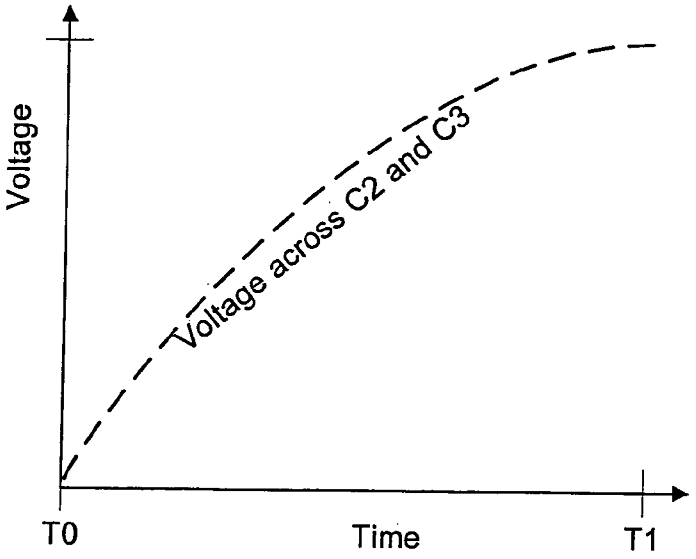
FIGS. 12A and B represent timing diagrams illustrating the voltages across capacitor C1, C2 and C3 during time interval $T_0$ to $T_1$.
Figure 12B:
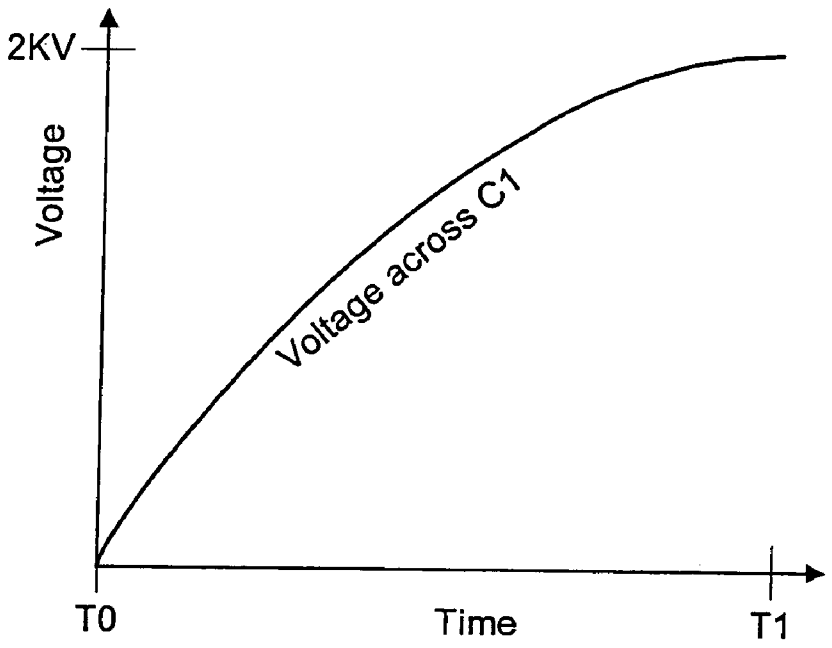

During the $T_0$ to $T_1$ capacitor charging interval illustrated in FIGS. 11 and 12, capacitors C1, C2 and C3 begin charging from a zero voltage up to the two thousand volt output generated by the high voltage power supply. Spark gaps GAP1 and GAP2 remain in the open, near infinite impedance configuration because only at the end of the T0 to T1 capacitor charging interval will the C1/C2 capacitor output voltage approach the two thousand volt breakdown rating of GAP1.

Figure 13:
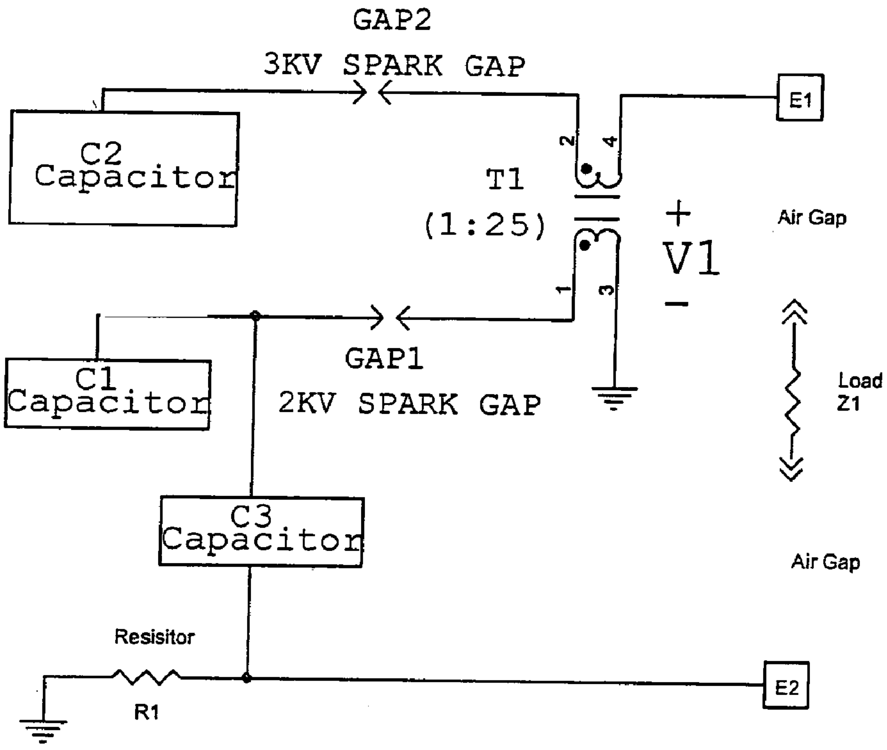
FIG. 13 illustrates the operating configuration of the FIG. 11 circuit during the T1 to T2 time interval.
Figure 14A:
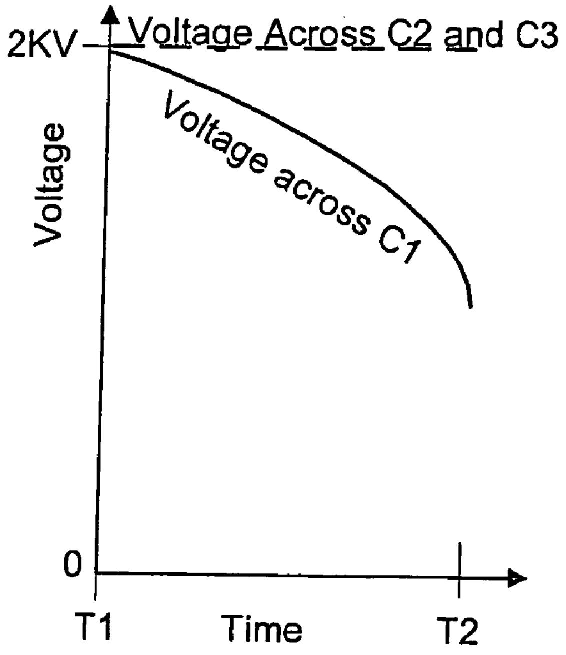
FIGS. 14A and B illustrate the voltages across capacitors C1, C2 and C3 during the T1 to T2 time interval.
Figure 14B:
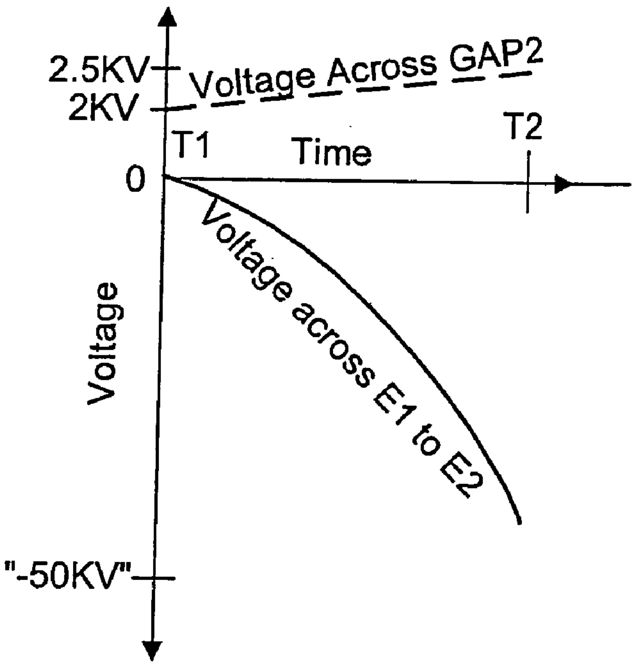

Referring now to FIGS. 13 and 14, as the voltage on capacitors C1 and C2 reaches the two thousand volt breakdown voltage of spark gap GAP1, a spark will be formed across the spark gap and the spark gap impedance will drop to a near zero level. This transition is indicated in the FIG. 14 timing diagrams as well as in the more simplified FIG. 3B and FIG. 6 timing diagrams. Beginning at time T1, capacitor C1 will begin discharging through the primary winding of transformer T1 which will rapidly ramp up the E1 to E2 secondary winding output voltage to negative fifty thousand volts as shown in FIG. 14B. FIG. 14A illustrates that the voltage across capacitor C1 relatively slowly decreases from the original two thousand volt level while the FIG. 14B timing diagram illustrates that the multiplied voltage on the secondary winding of transformer T1 will rapidly build up during the time interval T1 to T2 to a voltage approaching minus fifty thousand volts.

At the end of the T2 time interval, the FIG. 10 circuit transitions into the second configuration where the three thousand volt GAP2 spark gap has been ionized into a near zero impedance level allowing capacitors C2 and C3 to discharge across stun gun output terminals E1 and E2 through the relatively low impedance load target. Because as illustrated in the FIG. 16 timing diagram, the voltage across C1 will have discharged to a near zero level as time approaches T2, the FIG. 15 simplification of the FIG. 10 circuit diagram which illustrates the circuit configuration during the T2 to T3 time interval shows that capacitor C1 has effectively and functionally been taken out of the circuit. As illustrated by the FIG. 16 timing diagram, during the T2 to T3 time interval, the voltage across capacitors C2 and C3 decreases to zero as these capacitors discharge through the now low impedance (target only) load seen across output terminals E1 and E2.

FIG. 17 represents another timing diagram illustrating the voltage across GAP2 and the voltage across stun gun output terminals E1 and E2 during the T2 to T3 time interval.

Figure 4B:
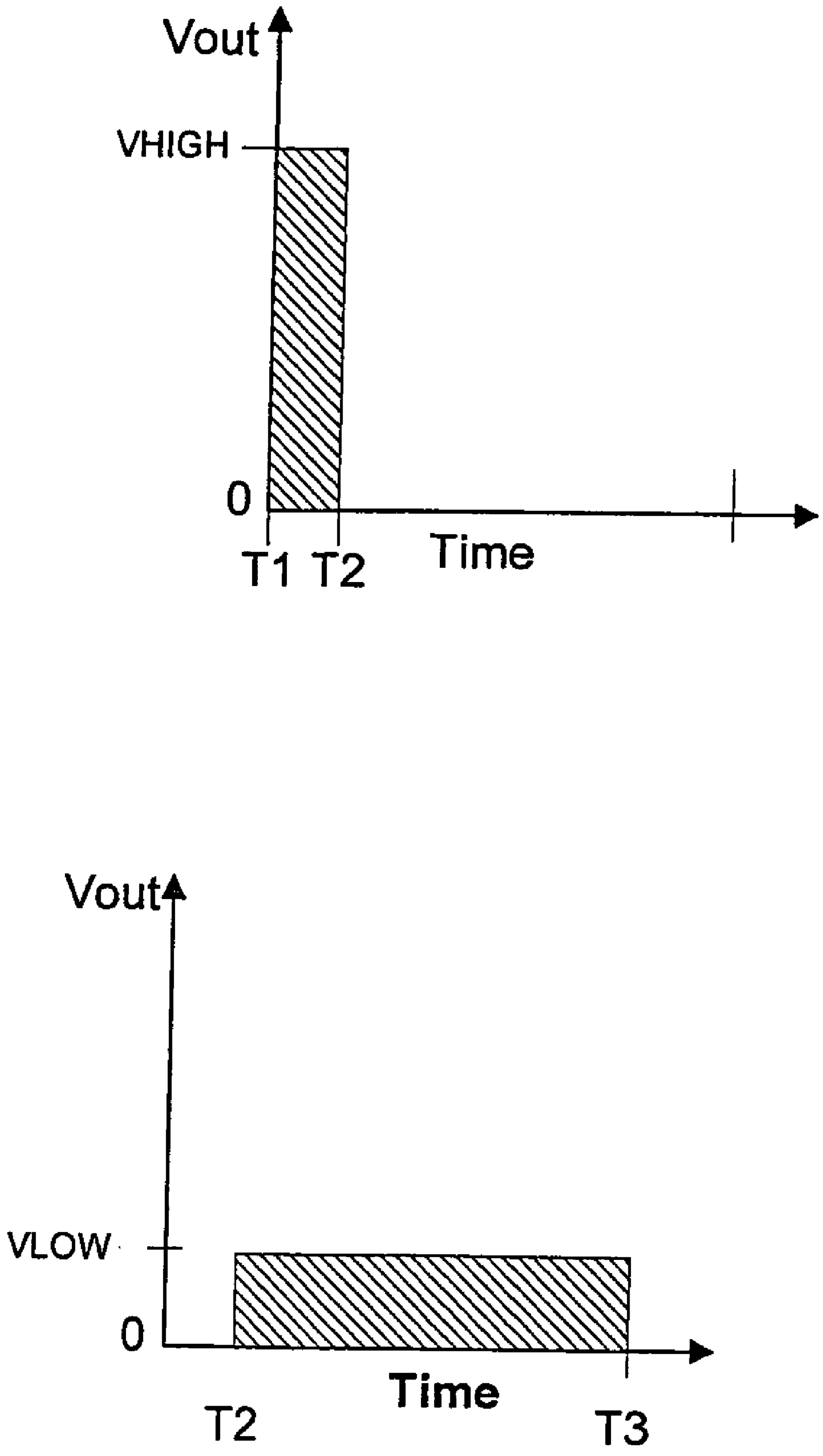
FIG. 4B represents a graph illustrating a generalized output voltage waveform for the FIG. 4A circuit element during the second time interval.
Figure 5C:
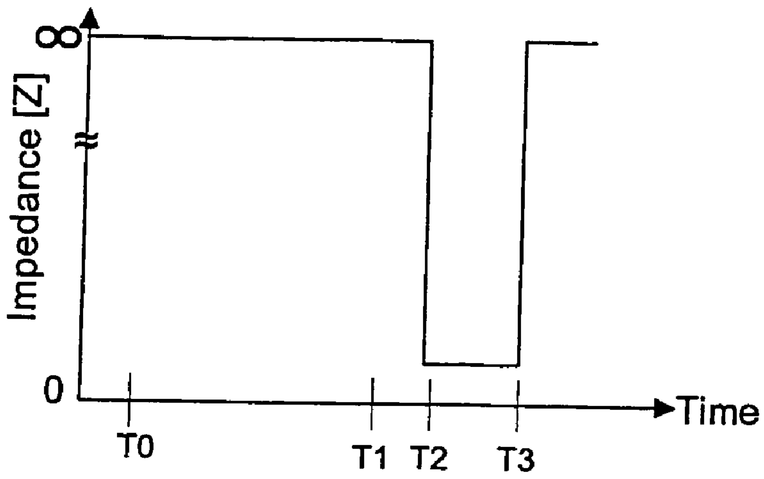
FIG. 5C represents a graph illustrating the high impedance to low impedance configuration charge across the air gap caused by transition from the FIG. 5A circuit configuration into the FIG. 5B (ionized) circuit configuration.
Figure 6:
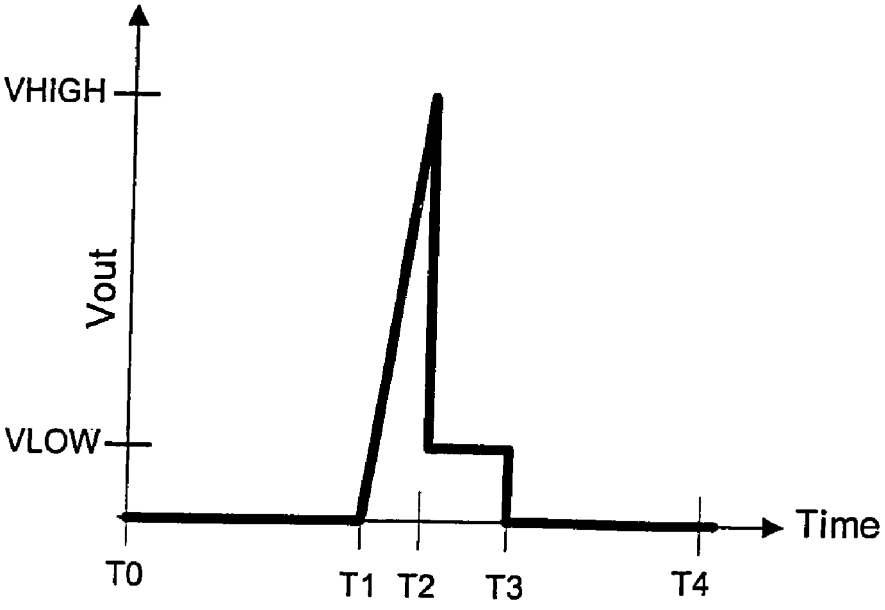
FIG. 6 illustrates a graphic representation of a plot of voltage versus time for the FIG. 2 circuit diagram.
Figure 7:
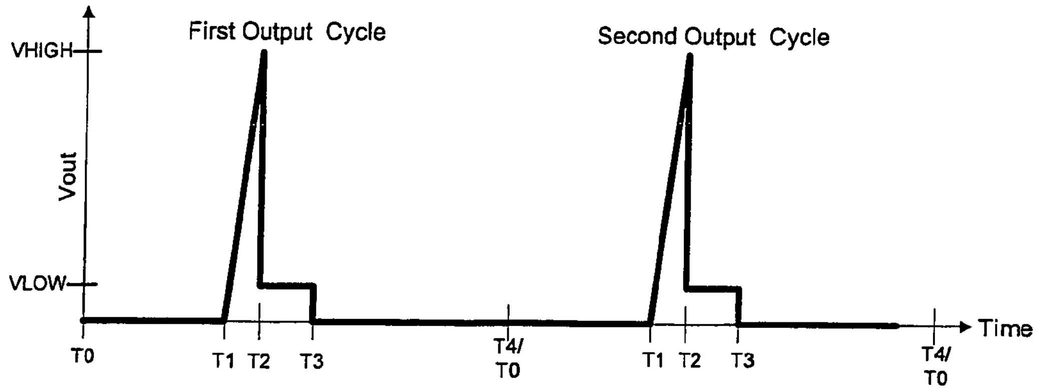
FIG. 7 illustrates a pair of sequential output pulses corresponding to two of the output pulses of the type illustrated in FIG. 6.

In one preferred embodiment of the FIG. 10 circuit, capacitor C1, the discharge of which provides the relatively high energy level required to ionize the high impedance air gap between E1 and E3, can be implemented with a capacitor rating of 0.14 microFarads and two thousand volts. As previously discussed, capacitor C1 operates only during time interval T1 to T2 which, in this preferred embodiment, approximates on the order of 1.5 microseconds in duration. Capacitors C2 and C3 in one preferred embodiment may be selected as 0.02 microFarad capacitors for a two thousand power supply voltage and operate during the T2 to T3 time interval to generate the relatively low voltage output as illustrated in FIG. 4B to maintain the current flow through the now low impedance dart-to-target air gap during the T2 to T3 time interval as illustrated in FIG. 5C. In this particular preferred embodiment, the duration of the T2 to T3 time interval approximates 50 microseconds.

The duration of the T1 to T2 time interval can be varied from 1.5 to 0.5 microseconds. The duration of the T2 to T3 time interval can be varied from twenty to two hundred microseconds.

Due to many variables, the duration of the T0 to T1 time interval charge. For example, a fresh battery may shorten the T0 to T1 time interval in comparison to circuit operation with a partially discharged battery. Similarly, operation of the stun gun in cold weather which degrades battery capacity might also increase the T0 to T1 time interval.

Figure 8:
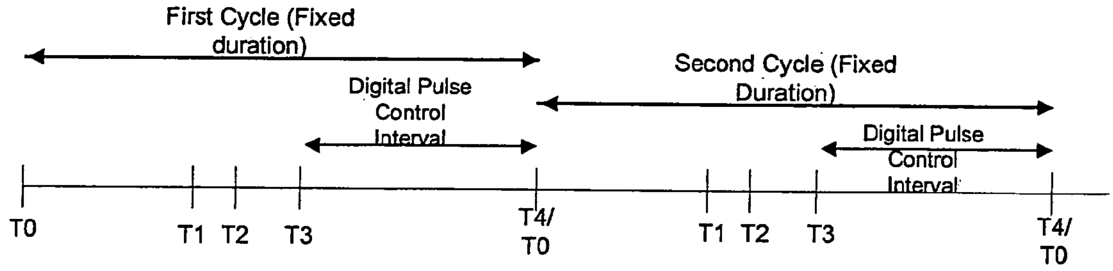
FIG. 8 illustrates a sequence of two output pulses.

Since it is highly desirable to operate stun guns with a fixed pulse repetition rate as illustrated in the FIG. 8 timing diagram, the circuit of the present invention provides a microprocessor-implemented digital pulse control interval designated as the T3 to T4 interval in FIG. 8. As illustrated in the FIG. 10 block diagram, the microprocessor receives a feedback signal from the high voltage power supply via a feedback signal conditioning element which provides a circuit operating status signal to the microprocessor. The microprocessor is thus able to detect when time T3 has been reached as illustrated in the FIG. 6 timing diagram and in the FIG. 8 timing diagram. Since the commencement time T0 of the operating cycle is known, the microprocessor will maintain the high voltage power supply in a shut down or disabled operating mode from T3 until the factory preset pulse repetition rate defined by the T0 to T4 time interval has been achieved. While the duration of the T3 to T4 time interval will vary, the microprocessor will maintain the T0 to T4 time interval constant.

The FIG. 18 table entitled "Gap On/Off Timing" represents a simplified summary of the configuration of GAP1 and GAP2 during the four relevant operating time intervals. The configuration "off" represents the high impedance, non-ionized spark gap state while the configuration "on" represents the ionized state where the spark gap breakdown voltage has been reached.

FIG. 19 represents a simplified block diagram of a circuit analogous to the FIG. 10 circuit except that the circuit has been simplified to include only capacitors C1 and C2. The FIG. 19 circuit is capable of operating in a highly efficient or "tuned" dual mode configuration according to the teachings of the present invention.

Figure 20:
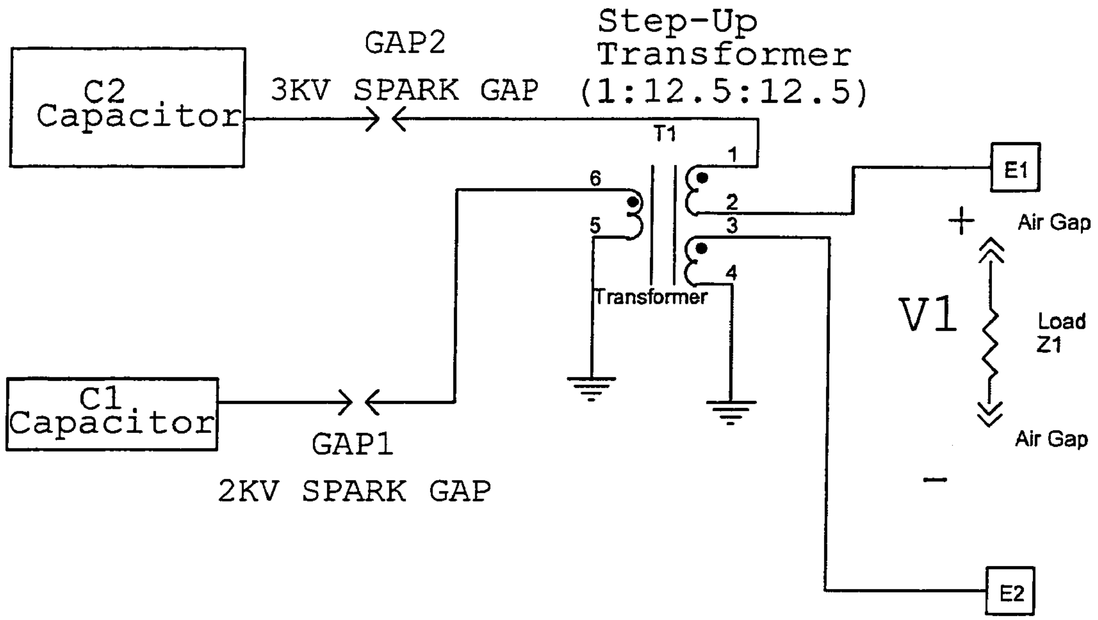
FIG. 20 represents another embodiment of the invention including an alternative output transformer designer having a single primary winding and a pair of secondary windings.

FIG. 20 illustrates an alternative configuration for coupling capacitors C1 and C2 to the stun gun output electrodes E1 and E2 via an output transformer having a single primary winding and a center-tapped or two separate secondary windings. The step up ratio relative to each primary winding and each secondary winding represents a ratio of one to 12.5. This modified output transformer still accomplishes the objective of achieving a twenty-five to one step-up ratio for generating an approximate fifty thousand volt signal with a two thousand volt power supply rating. One advantage of this double secondary transformer configuration is that the maximum voltage applied to each secondary winding is reduced by fifty percent. Such reduced secondary winding operating potentials may be desired in certain conditions to achieve a higher output voltage with a given amount of transformer insulation or for placing less high voltage stress on the elements of the output transformer.

Figure 1:
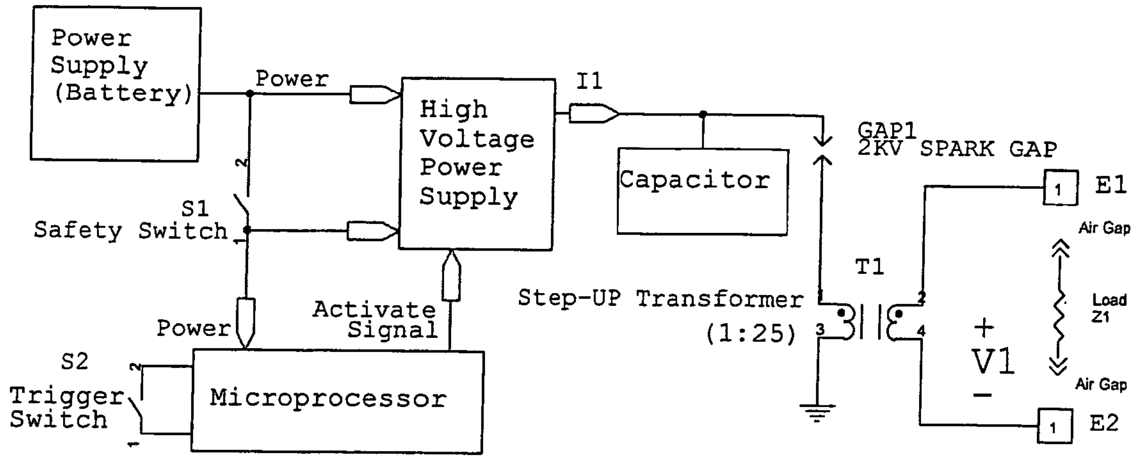
FIG. 1 illustrates a high performance prior art stun gun circuit.

Substantial and impressive benefits may be achieved by using the electronic disabling device of the present invention which provides for dual mode operation to generate a time-sequenced, shaped voltage output waveform in comparison to the most advanced prior art stun gun represented by the Taser M26 stun gun as illustrated and described in connection with the FIG. 1 block diagram.

The Taser M26 stun gun utilizes a single energy storage capacitor having a 0.88 microFarad capacitance rating. When charged to two thousand volts, that 0.88 microFarad energy storage capacitor stores and subsequently discharges 1.76 Joules of energy during each output pulse. For a standard pulse repetition rate of fifteen pulses per second with an output of 1.76 Joules per discharge pulse, the Taser M26 stun gun requires around thirty-five watts of input power which, as explained above, must be provided by a large, relatively heavy battery power supply utilizing eight series-connected AA alkaline battery cells.

For one embodiment of the electronic disabling device of the present invention which generates a time-sequenced, shaped voltage output waveform and with a C1 capacitor having a rating of 0.07 microFarads and a single capacitor C2 with a capacitance of 0.01 microFarads (for a combined rating of 0.08 microFarads), each pulse repetition consumes only 0.16 Joules of energy. With a pulse repetition rate of 15 pulses per second, the two capacitors consume battery power of only 2.4 watts at the capacitors (roughly 3.5 to 4 watts at the battery), a ninety percent reduction, compared to the twenty-six watts consumed by the state of the art Taser M26 stun gun. As a result, this particular configuration of the electronic disabling device of the present invention which generates a time-sequenced, shaped voltage output waveform can readily operate with only a single AA battery due to its 2.4 watt power consumption.

Figure 3A:
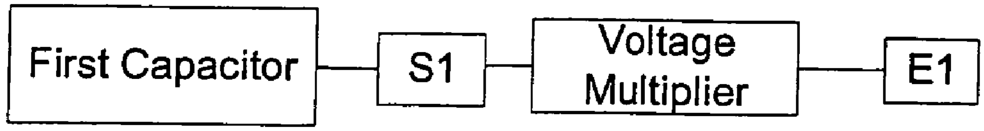
FIG. 3A represents a block diagram illustration of a first segment of the system block diagram illustrated in FIG. 2 which functions during a first time interval.
Figure 3B:
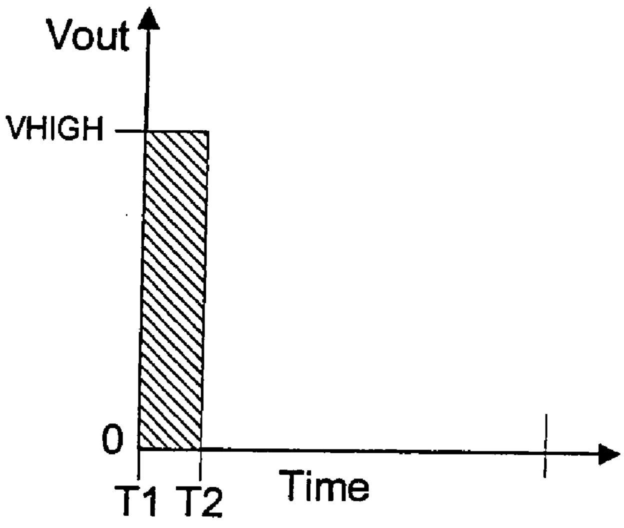
FIG. 3B represents a graph illustrating a generalized output voltage waveform of the circuit element shown in FIG. 3A.

Because the electronic disabling device of the present invention generates a time-sequenced, shaped voltage output waveform as illustrated in the FIG. 3B and FIG. 4B timing diagrams, the output waveform of this invention is tuned to most efficiently accommodate the two different load configurations presented: a high voltage output operating mode during the high impedance T1 to T2 first operating interval and, a relatively low voltage output operating mode during the low impedance second T2 to T3 operating interval.

Figure 4A:
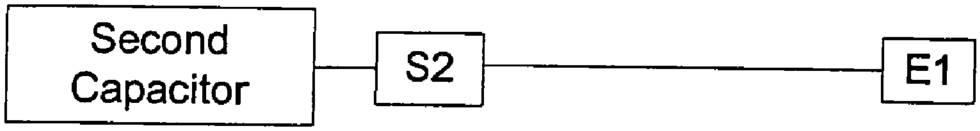
FIG. 4A illustrates a second element of the FIG. 2 system block diagram which operates during a second time interval.

As illustrated in the FIG. 5C timing diagram and in the FIGS. 2, 3A and 4A simplified schematic diagrams, the circuit of the present invention is selectively configured into a first operating configuration during the T1 to T2 time interval where a first capacitor operates in conjunction with a voltage multiplier to generate a very high voltage output signal sufficient to breakdown the high impedance target-related air gap as illustrated in FIG. 5A. Once that air gap has been transformed into a low impedance configuration as illustrated in the FIG. 5C timing diagram, the circuit is selectively reconfigured into the FIG. 3A second configuration where a second or a second and a third capacitor discharge a substantial amount of current through the now low impedance target load (typically thousand Ohms or less) to thereby transfer a substantial amount of electrical charge through the target to cause massive disruption of the target's neurological control system to maximize target incapacitation.

Accordingly, the electronic disabling device of the present invention which generates a time-sequenced, shaped voltage output waveform is automatically tuned to operate in a first circuit configuration during a first time interval to generate an optimized waveform for attacking and eliminating the otherwise blocking high impedance air gap and is then returned to subsequently operate in a second circuit configuration to operate during a second time interval at a second much lower optimized voltage level to efficiently maximize the incapacitation effect on the target's skeletal muscles. As a result, the target incapacitation capacity of the present invention is maximized while the stun gun power consumption is minimized.

As an additional benefit, the circuit elements operate at lower power levels and lower stress levels resulting in either more reliable circuit operation and can be packaged in a much more physically compact design. In a laboratory prototype embodiment of a stun gun incorporating the present invention, the prototype size in comparison to the size of present state of the art Taser M26 stun gun has been reduced by approximately fifty percent and the weight has been reduced by approximately sixty percent.

An enhanced stun gun one embodiment of which is currently designated as the X-26 system includes a novel battery capacity readout system designed to create a device that is more reliable and dependable in the field. With previous battery operated stun guns, users have experienced major difficulty in determining exactly how much battery capacity remains in the batteries.

In most electronic devices the remaining battery capacity can be predicted either by measuring the battery voltage during operation or integrating the battery discharge current over time. Because the X26 system draws current at very different rates depending on the mode in which it operates, prior art battery management methods yield unreliable results. Because the X26 system is expected to function over a wide operating temperature range, non-temperature compensated prior art battery capacity prediction methods produce even less reliable results.

The battery consumption of the X26 system varies with its operating mode:

1) The X26 system includes a real time clock which draws around 3.5 microamps;

2) If the system safety switch is armed, the now-activated microprocessor and its clock system draw around four milliamps;

3) If enabled, and if the safety switch is armed, the X26 system laser target designator will draw around eleven milliamps;

4) If enabled, and if the safety switch is armed, the forward facing low intensity twin white LED flashlight will draw around sixty-three milliamps;

5) If the safety switch is armed and the trigger is pulled, the X26 system will draw about three to four amps;

As evident from the above examples, the minimum to maximum current drain will vary in a ratio of a million to one.

To further complicate matters, the capacity of the CR123 lithium batteries packaged in the system battery model varies greatly over the operating temperature range of the X26 system. At −20 C., the X26 dual in-series CR123 battery module can deliver around one hundred five-second discharge cycles. At +30 C., the X26 system battery module can deliver around three hundred and fifty five-second discharge cycles.

Figure 21:
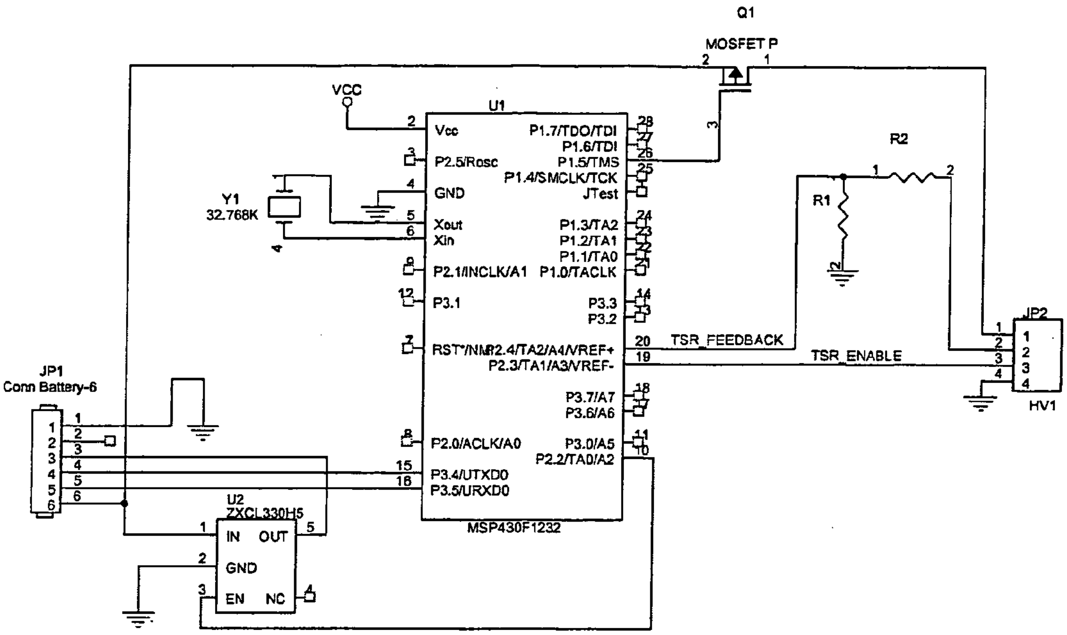
FIG. 21 illustrates a preferred embodiment of the microprocessor section of the present invention.
Figure 22:
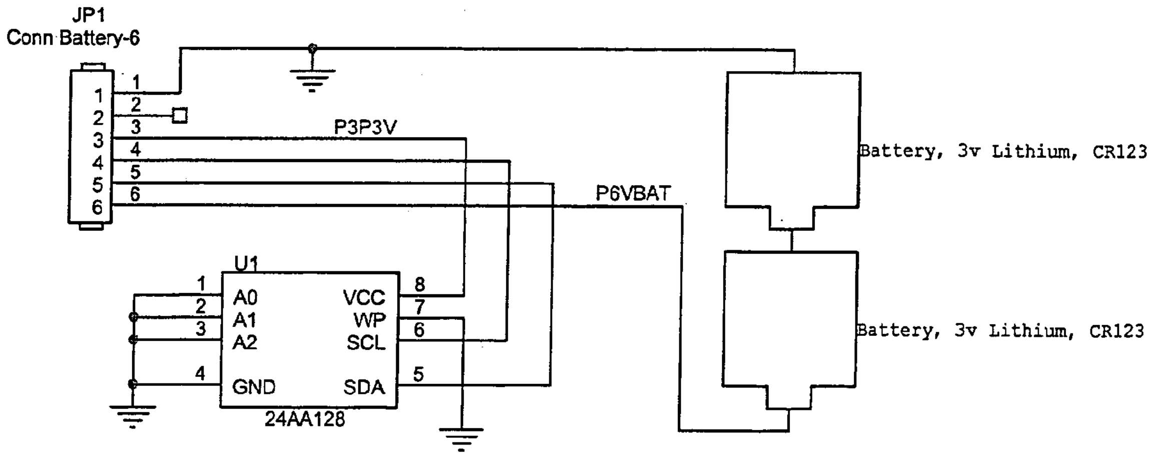
FIG. 22 represents an electrical schematic diagram of the system battery module.
Figure 31:
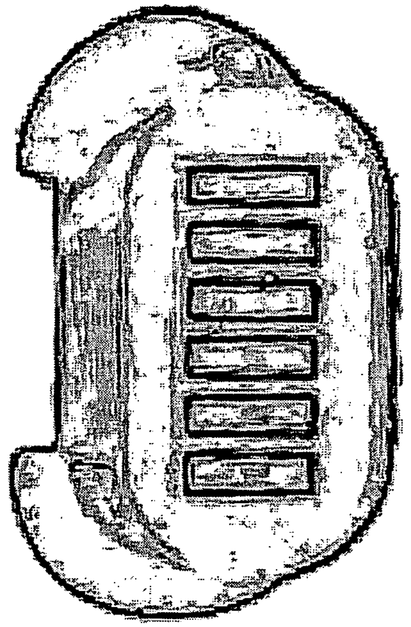
FIG. 31 illustrates a view from above of the battery module illustrated in FIG. 30.

From the warmest to the coldest operating temperature range and from the lowest to the highest battery drain functions, a battery life ratio of around five million to one results. Since the wide range in battery drain makes prior art battery prediction methods unreliable, a new battery capacity assessment system was required for the X26 system. The new battery capacity assessment system predicts the remaining battery capacity based on actual laboratory measurements of critical battery parameters under different load and at different temperature conditions. These measured battery capacity parameters are stored electronically as a table (FIG. 27) in an electronic non-volatile memory device included with each battery module. (FIG. 22) As illustrated in FIGS. 21 and 22 and in FIGS. 31 and 32, appropriate data interface contacts enable the X26 microprocessor to communicate with the table electronically stored in the battery module to predict remaining battery capacity. The X26 system battery module with internal electronic non-volatile memory may be referred to as the Digital Power Magazine (DPM) or simply as the system battery module.

The data required to construct the data tables for the battery module were collected by operating the various X26 system features at selected temperatures spanning the X26 system operating temperature range while recording the battery performance and longevity at each temperature interval.

The resulting battery capacity measurements were collected and organized into a tabular spreadsheet of the type illustrated in FIG. 27. The battery drain parameters for each system feature were calculated and translated into standardized drain values in microamp/hours based on the sensible operating condition of that feature. For example, the battery drain required to keep the clock alive is represented by a number in uAHRS that totals the current required to keep the clock alive for twenty-four hours. The battery drain to power up the microprocessor, the forward directed flashlight, and the laser target designator for one second are represented by separate table entries with values in uAHRS. The battery drain required to operate the gun in the firing mode is represented by numbers in uAHRS of battery drain required to fire a single power output pulse.

To enable the X26 system to be operated at all various temperatures, while keeping track of battery drain and remaining battery capacity, the total available battery capacity at each incremental temperature was measured. The battery capacity in uAHRS at 25° C. (ambient) was programmed into the table to represent a normalized one hundred percent battery capacity value. The battery table drain numbers at other temperatures were adjusted to coordinate with the 25° C. total (one hundred percent) battery capacity number. For example, since the total battery capacity at −20° C. was measured to approximate thirty-five percent of the battery capacity at 25° C., the uAHR numbers at −20° C. were multiplied by one over 0.35.

Figure 33:
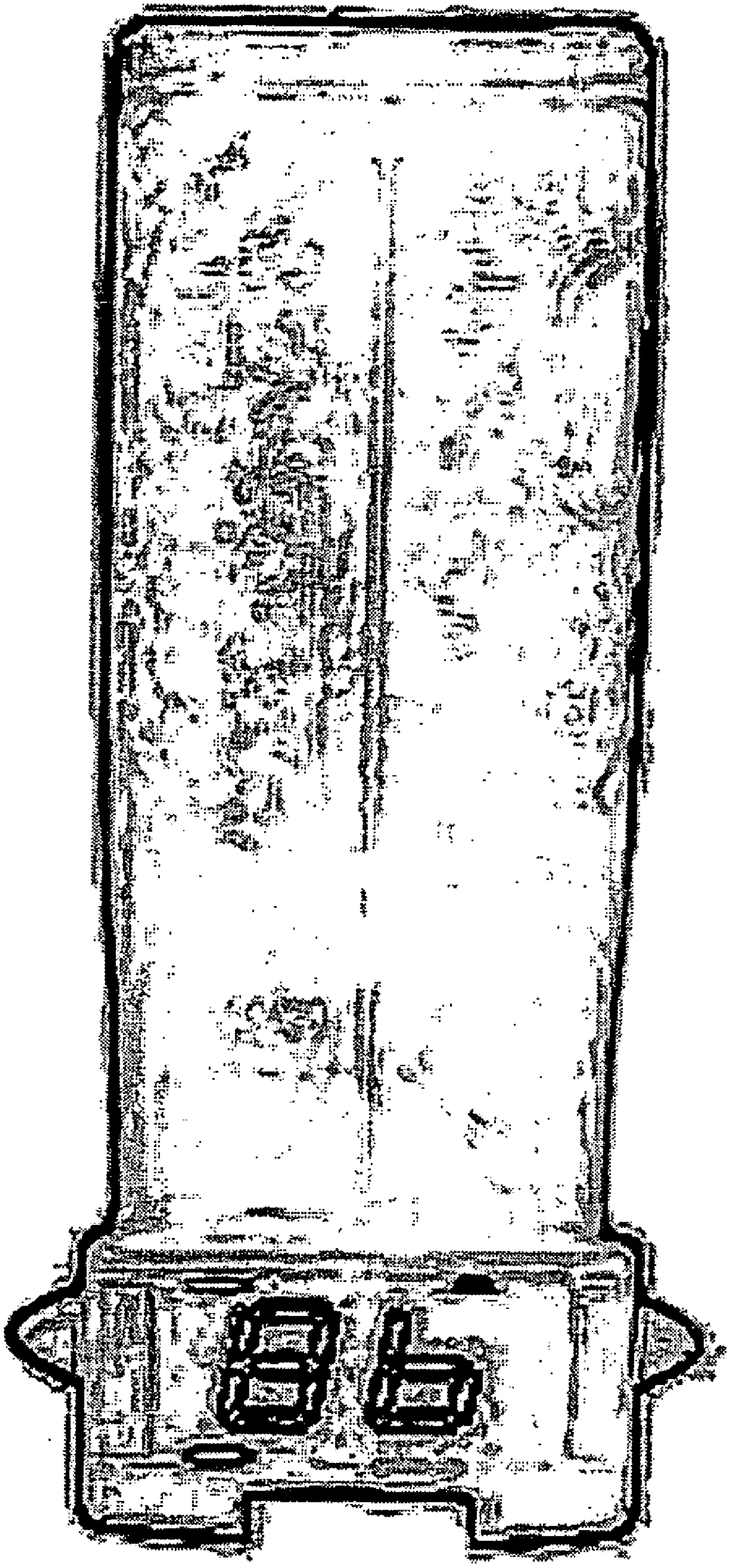
FIG. 33 represents a view from the left side of the stun gun depicted in FIG. 28.

A separate location in the FIG. 27 table is used by the X26 system microprocessor to keep track of used battery capacity. This number is updated every one second if the safety selector remains in the "armed" position, and every twenty-four hours if the safety selector remains in the "safe" position. Remaining battery capacity percentage is calculated by dividing this number by the total battery capacity. The X26 system will display this percent of battery capacity remaining on the two digit Central Information Display (CID) 14 shown in FIG. 33 for two seconds each time the weapon is armed. See, for example, the ninety-eight percent battery capacity read-out depicted in the FIG. 33 X26 system rear view.

Figure 30:
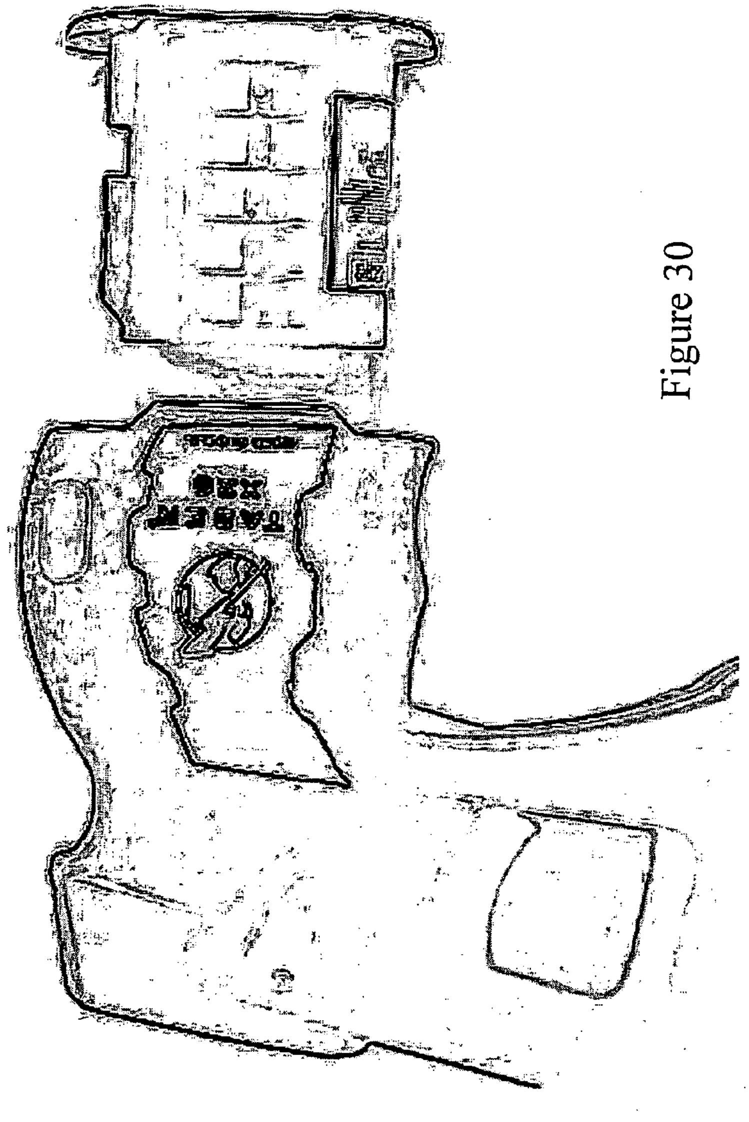
FIG. 30 represents a partially cutaway side view of the stun gun illustrated in FIG. 28, particularly illustrating the shape and configuration of the removable battery module.

FIG. 22 illustrates the electronic circuit located inside the X26 battery module 12. As illustrated in the FIG. 22 schematic diagram and in the FIG. 30 view of X26 system 10, the removable battery module 12 consists of two series-connected, three volt CR123 lithium batteries and a non-volatile memory device. The nonvolatile memory device may take the form of a 24AA128 flash memory which contains 128K bits of data storage. As shown in FIGS. 21 and 22, the electrical and data interface between the X26 system microprocessor and battery module 12 is established by a six pin jack JP1 and provides a two-line 12C serial bus for data transmission purposes.

While the battery capacity monitoring apparatus and methodology has been described in connection with monitoring the remaining capacity of a battery energized power supply for a stun gun, this inventive feature could readily be applied to any battery powered electronic device which includes a microprocessor, such as cell phones, video camcorders, laptop computers, digital cameras, and PDA's. Each of these categories of electronic devices frequently shift among various different operating modes where each operating mode consumes a different level of battery power. For example, for a cell phone, the system selectively operates in the following different power consumption modes:

1) power off/microprocessor clock on;
2) power on standby/receive mode;
3) receiving an incoming telephone call and amplifying the received audio input signal;
4) transmit mode generating an RF power output of about 600 milliwatts;
5) ring signal activated in response to an incoming call; and
6) backlight "on".

To implement the present invention in a cell phone embodiment, a battery module analogous to that illustrated in the FIG. 22 electrical schematic diagram would be provided. That module would include a memory storage device such as the element designated by reference number U1 in the FIG. 22 schematic diagram to receive and store a battery consumption table as illustrated in FIG. 27. The cell phone microprocessor can then be programmed to read out and display either at power up or in response to a user-selectable request the battery capacity remaining within the battery module or the percent of used capacity.

Similar analysis and benefits apply to the application of the battery capacity monitor of the present invention to other applications such as a laptop computer which selectively switches between the following different battery power consumption modes:

1) CPU "on," but operating in a standby power conservation mode;
2) CPU operating in a normal mode with the hard drive in the "on" configuration;
3) CPU operating in a normal mode with the hard drive in the "off" configuration;
4) CPU "on" and LCD screen also in the "on" fully illuminated mode;
5) CPU operating normally with the LCD screen switched into the "off" power conservation configuration;
6) modem on/modem off modes;
7) optical drives such as DVD or CD ROM drives operating in the playback mode;
8) optical drives such as DVD or CD ROM drives operating in the record or write mode; and 9) laptop audio system generating an audible output as opposed to operating without an audio output signal.

In each of the cases addressed above, the battery capacity table would be calibrated for each different power consumption mode based on the power consumption of each individual operating element. Battery capacity would also be quantified for a specified number of different ambient temperature operating ranges.

Tracking the time remaining on the manufacturer's warranty as well as updating and extending the expiration date represents a capability which can also be implemented by the present invention.

An X26 system embodiment of the present invention is shipped from the factory with an internal battery module 12 (DPM) having sufficient battery capacity to energize the internal clock for much longer than 10 years. The internal clock is set at the factory to the GMT time zone. The internal X26 system electronic warranty tracker begins to count down the factory preset warranty period or duration beginning with the first trigger pull occurring twenty-four hours or more after the X26 system has been packaged for shipment by the factory.

Whenever the battery module 12 is removed from the X26 system and replaced one or more seconds later, the X26 system will implement an initialization procedure. During that procedure, the two-digit LED Central Information Display (CID) designated by reference number 14 in FIG. 33, will sequentially read out a series of two-digit numbers which represent the following data:

1) The first three sets of two digit numbers represent the warranty expiration date. The format is YY/MM/DD;
2) Next, the current time is displayed: YY/MM/DD;
3) Then the internal temperature in degrees Centigrade is displayed: XX (negative numbers are represented by blinking the number); and
4) Finally, the software revision is displayed: XX.

Figure 32:
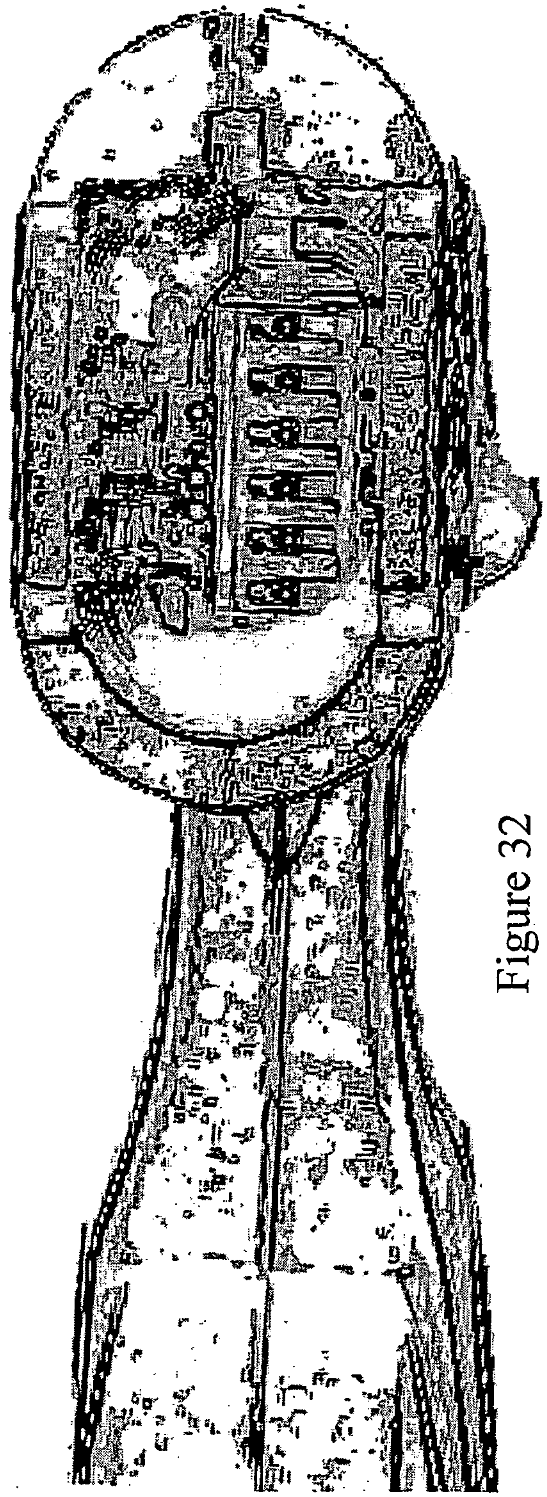
FIG. 32 illustrates a partially cutaway view from below of the stun gun shown in FIG. 28 where the battery module has been removed.

The system warranty can be extended by different techniques:

1) By Internet: The X26 system includes a USB data interface module accessory which is physically compatible with the shape of the X26 system receptacle for battery module 12. The USB data module can be inserted within the X26 system battery module receptacle and includes a set of electrical contacts compatible with jack JP1 located inside the X26 system battery module housing as illustrated in FIG. 32. The USB interface module may be electrically connected to a computer USB port which supplies power via jack JP1 to the X26 system. While the USB interface is normally used to download firing data from the X26 system, it can also be used to extend the warranty period or to download new software into the X26 microprocessor system. To update the warranty, the user removes the X26 battery module 12, inserts the USB module, connects a USB cable to an Internet enabled computer, goes to the www.Taser.com website, follows the download X26 system warranty extension instructions, and pays for the desired extended warranty period by credit card.
2) By Extended Warranty Battery Module: The system warranty can also be extended by purchasing from the factory a specially programmed battery module 12 having the software and data required to reprogram the warranty expiration data stored in the X26 microprocessor. The warranty extension battery module is inserted into the X26 system battery receptacle. If the X26 system warranty period has not yet expired, the data transferred to the X26 microprocessor will extend the current warranty expiration date by the period pre-programmed into the extended warranty battery module. Once the extended warranty expiration date has been stored within the X26 system, the microprocessor will initiate a battery insertion initialization sequence and will then display the new warranty expiration date. Various different warranty extension modules can be provided to either extend the warranty of only a single X26 system or to provide warranty extensions for multiple system as might be required to extend the warranty for X26 systems used by an entire police department. If the warranty extension module contains only one warranty extension, the X26 microprocessor will reset the warranty update data in the module to zero. The module can function either before or after the warranty extension operation as a standard battery module. An X26 system may be programmed to accept one warranty extension, for example a one year extension, each time that the warranty extension module is inserted into the weapon.

The warranty configuration/warranty extension feature of the present invention could also readily be adapted for use with any microprocessor-based electronic device or system having a removable battery. For example, as applied to a cell phone having a removable battery module, a circuit similar to that illustrated in the FIG. 22 electrical schematic diagram could be provided in the cell phone battery module to interface with the cellular phone microprocessor system. As was the case with the X26 system of the present invention, the cell phone would be originally programmed at the factory to reflect a device warranty of predetermined duration at the initial time that the cell phone was powered up by the ultimate user/customer. By purchasing a specially configured cell phone replacement battery including data suitable for reprogramming the warranty expiration date within the cell phone microprocessor, a customer could readily replace the cell phone battery while simultaneously updating the system warranty.

Alternatively, a purchaser of an electronic device incorporating the warranty extension feature of the present invention could return to a retail outlet, such as Best Buy or Circuit City, purchase a warranty extension and have the on-board system warranty extended by a representative at that retail vendor. This warranty extension could be implemented by temporarily inserting a master battery module incorporating a specified number of warranty extensions purchased by the retail vendor from the OEM manufacturer. Alternatively, the retail vendor could attach a USB interface module to the customer's cell phone and either provide a warranty extension directly from the vendor's computer system or by means of data supplied by the OEM manufacturer's website.

For electronic devices utilizing rechargeable battery power supplies such as is the case with cell phones and video camcorders, battery depletion occurs less frequently than with the system described above which typically utilizes non-rechargeable battery modules. For such rechargeable battery applications, the end user/customer could purchase a replacement rechargeable battery module including warranty update data and could simultaneously trade in the customer's original rechargeable battery.

For an even broader application of the warranty extension feature of the present invention, that feature could be provided to extend the warranty of other devices such as desktop computer systems, computer monitors or even an automobile. For such applications, either the OEM manufacturer or a retail vendor could supply to the customer's desktop computer, monitor or automobile with appropriate warranty extension data in exchange for an appropriate fee. Such data could be provided to the warranted product via direct interface with the customer's product by means of an infrared data communication port, by a hard-wired USB data link, by an IEEE 1394 data interface port, by a wireless protocol such as Bluetooth or by any other means of exchanging warranty extension data between a product and a source of warranty extension data.

Another benefit of providing an "intelligent" battery module is that the X26 system can be supplied with firmware updates by the battery module. When a battery module with new firmware is inserted into the X26 system, the X26 system microcontroller will read several identification bytes of data from the battery module. After reading the software configuration and hardware compatibility table bytes of the new program stored in the nonvolatile memory within the battery module to evaluate hardware/software compatibility and software version number, a system software update will take place when appropriate. The system firmware update process is implemented by having the microprocessor (see FIG. 21) in the X26 system read the bytes in the battery module memory program section and programming the appropriate software into the X26 system nonvolatile program memory.

The X26 system can also receive program updates through a USB interface module by connecting the USB module to a computer to download the new program to a nonvolatile memory provided within the USB module. The USB module is next inserted into the X26 system battery receptacle. The X26 system will recognize the USB module as providing a USB reprogramming function and will implement the same sequence as described above in connection with X26 system reprogramming via battery module.

Figure 23:
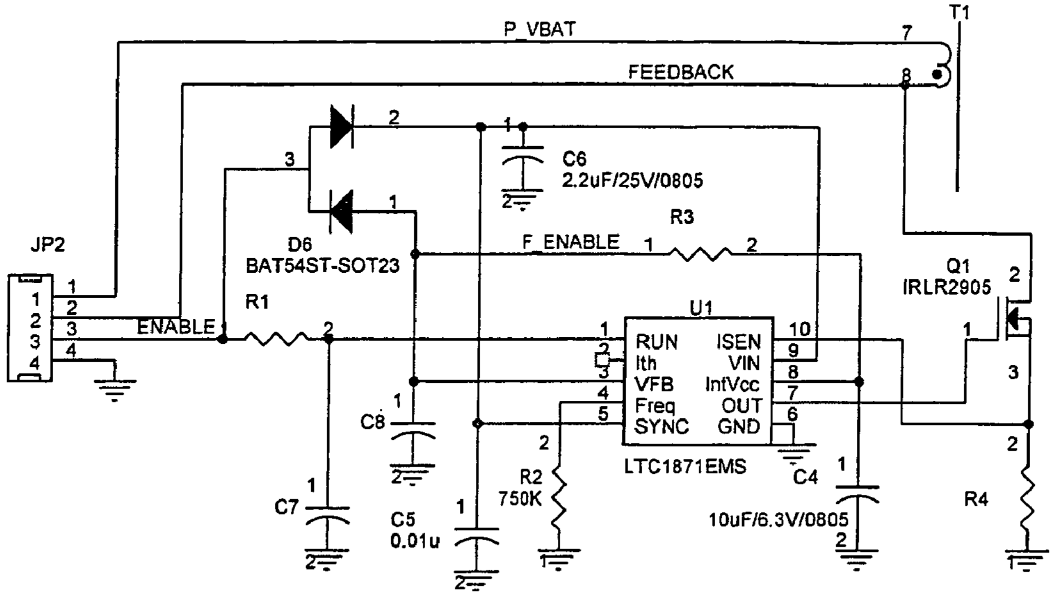
FIG. 23 and FIG. 24 taken together illustrate one preferred embodiment of a high voltage power supply according to the present invention.
Figure 24:
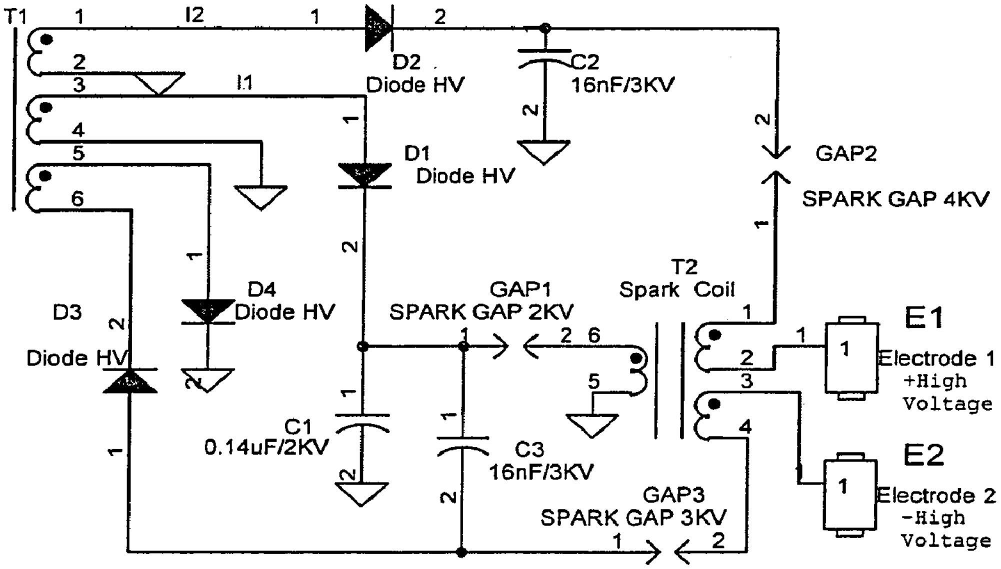

The High Voltage Assembly (HVA) schematically illustrated in FIGS. 23 and 24 converts a 3 to 6 Volt battery level to powerful 50 KV pulses having the capability of instantly incapacitating a subject. To provide maximum safety, to avoid false triggering, and to minimize the risk that the X26 system could activate or stay activated if the microprocessor malfunctions or locks up, the ENABLE signal from the microprocessor (FIG. 22) to the HVA (FIGS. 23, 24) has been specially encoded.

To enable the HVA, the microprocessor must output a 500 Hz square wave with an amplitude of 2.5 to six volts and around a fifty percent duty cycle. The D6 series diode within the HVA power supply "rectifies" the ENABLE signal and uses it to charge up capacitor C6. The voltage across capacitor C6 is used to run pulse width modulation (PWM) controller U1 in the HVA.

If the ENABLE signal goes low for more than around one millisecond, several functions operate to turn the PWM controller off:

1) The voltage across capacitor C6 will drop to a level where the PWM can no longer run causing the HVA to turn off.

2) The input to the U1 "RUN" pin must be above a threshold level. The voltage level at that point represents a time average of the ENABLE waveform (due to R1 and C7). If the ENABLE signal goes low, capacitor C7 will discharge and disable the controller after just over 1 millisecond.

As the ENABLE signal goes high, resistor R3 charges capacitor C8. If the charge level on C8 goes above 1.23 Volts, the PWM will shut down—stopping delivery of 50 KV output pulses. Every time the ENABLE signal goes low, capacitor C8 is discharged, making sure the PWM can stay "on" as the ENABLE signal goes back high and starts charging C8 again. Any time the ENABLE signal remains high for more than one millisecond, the PWM controller will be shut down.

The encoded ENABLE signal requirements dictate that the ENABLE signal must be pulsed at a frequency of around 500 Hz (one millisecond high, one millisecond low) to activate the HVA. If the ENABLE signal sticks at a high or low level, the PWM controller will shut down, stopping the delivery of the 50 KV output pulses.

The configuration of the X26 system high voltage output circuit represents a key distinction between the X26 system and conventional prior art stun guns. Referring now to FIGS. 23 and 24, the structure and function of the X26 system high voltage "shaped pulse" assembly will be explained. The switch mode power supply will charge up capacitors C1, C2, and C3 through diodes D1, D2, and D3. Note that diodes D1 and D2 can be connected to the same or to different windings of T1 to modify the output waveform. The ratios of the T1 primary and secondary windings and the spark gap voltages on GAP1, GAP2, and GAP3 are configured so that GAP1 will always breakover and fire first. When GAP1 fires, 2 KV is applied across the primary windings of spark coil transformer T2 from pin 6 to pin 5. The secondary voltage on spark coil transformer T2 from pins 1 to 2 and from pins 3 to 4 will approximate 25 KV, depending on the air gap spacing between the two output electrodes E1 and E2. The smaller the air gap, the smaller the output voltage before the air gap across output terminals E1 to E2 breaks down, effectively clamping the output voltage level.

The voltage induced in the secondary current path by the discharge of C1 through GAP1 and T2 sets up a voltage across C2, GAP2, E1 to E2, GAP3, C3 and C1. When the cumulative voltage across the air gaps (GAP2, E1 to E2, and GAP3) is high enough to cause them to break down, current will start flowing in the circuit, from C2 through GAP2, through the output electrodes E1 to E2, through GAP3, and through C3 in series with C1 back to ground. As long as C1 is driving the output current through GAP1 and T2, the output current as described will remain negative in polarity. As a result, the charge level stored in both C2 and C3 will increase. Once C1 has become somewhat discharged, T1 will not be able to maintain the output voltage across the output windings (from pin 1 to pin 2, and from pin 3 to pin 4). At that time, the output current will reverse and begin flowing in a positive direction and will begin depleting the charge on C2 and C3. The discharge of C1 is known as the "arc" phase. The discharge of C2 and C3 is known as the muscle "stimulation" phase.

Since the high voltage output coil T2 as illustrated in FIG. 24 consists of two separate secondary windings that create a negative polarity spark voltage on E1 followed by a positive polarity spark voltage on E2, the peak voltage measured from either electrode E1 or E2 to primary weapon ground will not exceed 25 KV, yet the peak voltage measured across power supply output terminals E1 and E2 will reach 50 KV. If the output coil T2 had utilized only a single secondary winding as is the case with all prior art stun guns and in other embodiments of the present invention, the maximum voltage from one output electrode (E1 or E2) referenced to primary weapon ground would reach 50 KV. Since a 25 KV output can establish an arc across a gap less than half the size of a gap that can establish an arc with a 50 KV output, reducing the peak output terminal to ground voltage by fifty percent from 50 KV to 25 KV reduces by more than a two to one ratio the risk that the user of this version of the X26 system will be shocked by the high voltage output pulses. This represents a significant safety enhancement for a handheld stun gun weapon.

Referring now to the FIGS. 23 and 24 schematic diagrams, a feedback signal from the primary side of the HVA (T1 pin 8) provides a mechanism for the FIG. 21 microprocessor to indirectly determine the voltage on capacitor C1, and hence where the X26 system power supply is operating within its pulse firing sequence. This feedback signal is used by the microprocessor to control the output pulse repetition rate.

The system pulse rate can be controlled to create either a constant or a time-varying pulse rate by having the microcontroller stop toggling the ENABLE signal for short time periods, thereby holding back the pulse rate to reach a preset, lower value. The preset values can changed based on the length of the pulse train. For example, in a police model, the system could be preprogrammed such that a single trigger pull will produce a five second long power supply activation period. For the first two seconds of that five second actuation period the microprocessor could be programmed to control (pull back) the pulse rate to nineteen pulses per second (PPS), while for the last three seconds of the five-second activation period the pulse rate could be programmed to be reduced to fifteen PPS. If the operator continues to hold the trigger down, after the five second cycle has been completed, the X26 system could be programmed to continue discharging at fifteen PPS for as long as the trigger is held down. The X26 system could alternatively be programmed to produce various different pulse repetition rate configurations such as, for example:

| | |
|---|---|
| 0–2 seconds | 17 PPS, |
| 2–5 seconds | 12 PPS, |
| 5–6 seconds | 0.1 PPS, |
| 6–12 seconds | 11 PPS, |
| 12–13 seconds | 0.1 PPS, |
| 13–18 seconds | 10 PPS, |
| 18–19 seconds | 0.1 PPS, |
| 18–23 seconds | 9 PPS. |

Such alternative pulse repetition rate configurations could be applied to a civilian version of the X26 system where longer activation periods are desirable. In addition, lowering the pulse rate will reduce battery power consumption, extend battery life, and potentially enhance the medical safety factor.

Figure 26:
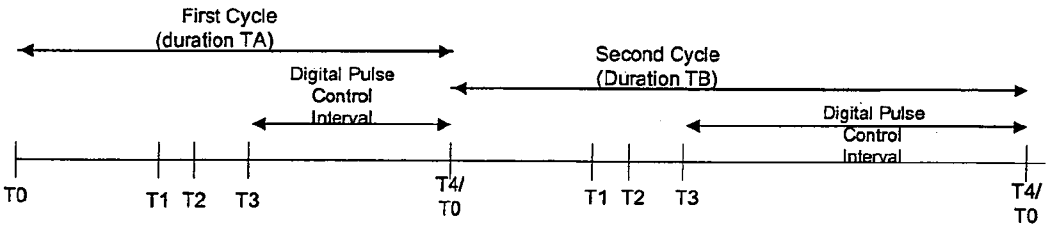
FIG. 26 represents a timing diagram illustrating the variable output cycle feature of one embodiment of the present invention.
Figure 28:
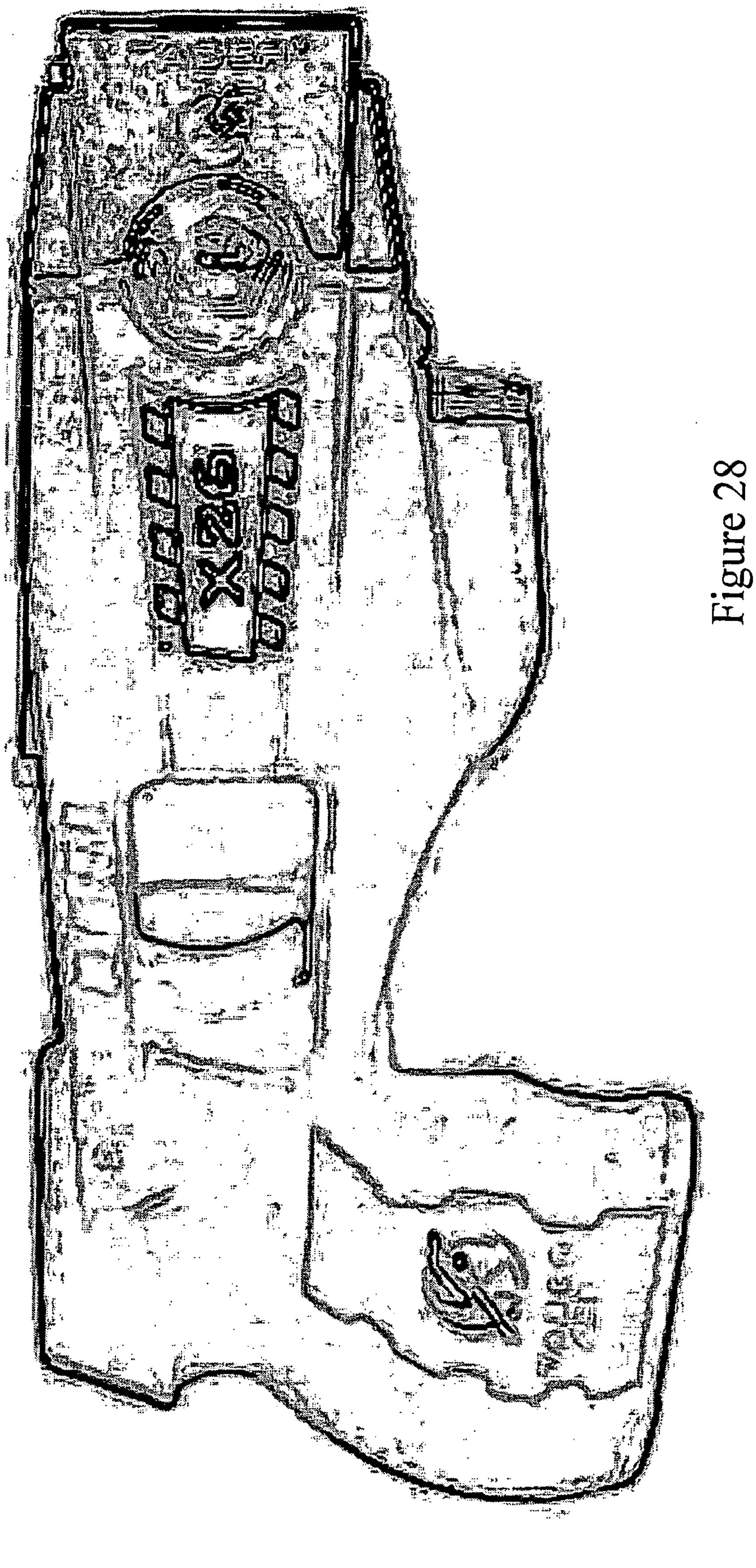
FIG. 28 represents a view from the side of one embodiment of a stun gun incorporating the present invention.
Figure 29:
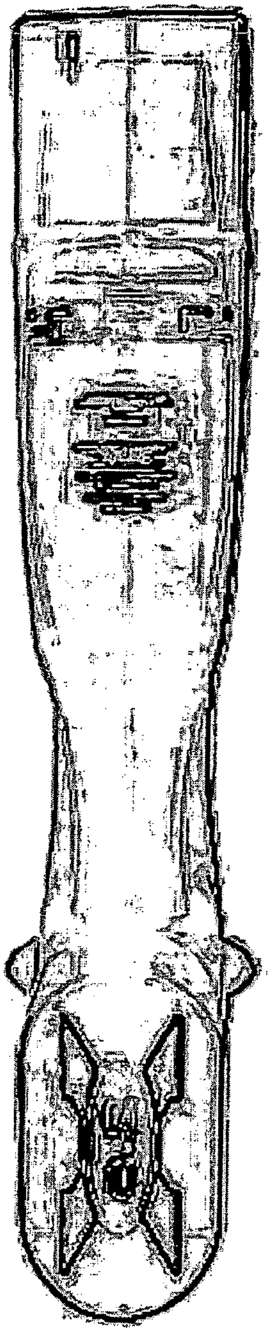
FIG. 29 represents a view from below of the stun gun illustrated in FIG. 28.

To explain the operation of the X26 system illustrated in FIGS. 21–24 in more detail, the operating cycle of the HVA can be divided into the following four time periods as illustrated in FIG. 26:

1) T0 to T1: Capacitors C1, C2 and C3 are charged by one, two or three power supplies to the breakdown voltage of spark gap GAP1;

2) T1 to T2: GAP1 has switched ON, allowing C1 to pass a current through the primary winding of the high voltage spark transformer T2 which causes the secondary voltage (across E1 to E2) to increase rapidly. At a certain point, the high output voltage caused by the discharge of C1 through the primary transformer winding will cause voltage breakdown across GAP2, across E1 to E2, and across GAP3. This voltage breakdown completes the secondary circuit current path, allowing output current to flow. During the T1 to T2 time interval, capacitor C1 is still passing current through the primary winding of the spark transformer T2. As C1 is discharging, it drives a charging current into both C2 and C3.

3) T2 to T3: Capacitor C1 is now mostly discharged. The load current is being supplied by C2 and C3. The magnitude of the output current during the T2 to T3 time interval will be much lower than the much higher output current produced by the discharge of C1 through spark transformer T2 during the initial T1 to T2 current output time interval. The duration of this significantly reduced magnitude output current during time interval T2 to T3 may readily be tuned by appropriate component parameter adjustments to achieve the desired muscle response from the target subject.

4) T3 to T4: During the time period T0 through T3, the microprocessor measured the time required to generate a single shaped waveform output pulse. The desired pulse repetition rate was pre-programmed into the microprocessor. During the T3 to T4 time interval, the microprocessor will temporarily shut down the power supply for a period required to achieve the preset pulse repetition rate. Because the microprocessor is inserting a variable length T3 to T4 shut-off period, the system pulse repetition rate will remain constant independent of battery voltage and circuit component variations (tolerance). The microprocessor-controlled pulse rate methodology allows the pulse rate to be software controlled to meet different customer requirements.

The FIG. 26 timing diagram shows an initial fixed timing cycle TA followed by a subsequent, longer duration timing cycle TB. The shorter timing cycle followed by the longer timing cycle reflects a reduction in the pulse rate. Hence, it is understood that the X26 system can vary the pulse rate digitally during a fixed duration operating cycle. As an example, a nineteen PPS pulse rate can be achieved during the first two seconds of operation and then reduced to fifteen PPS for three seconds, to 0.1 PPS for one second, and then increased to fourteen PPS for five seconds, etc.

The embodiment illustrated in FIGS. 23 and 24 utilizes three spark gaps. Only GAP1 requires a precise break-over voltage rating, in this case two thousand volts. GAP2 and GAP3 only require a break-over voltage rating significantly higher than the voltage stress induced on them during the time interval before GAP1 breaks down. GAP2 and GAP3 have been provided solely to ensure that if a significant target skin resistance is encountered during the initial current discharge into the target that the muscle activation capacitors C2 and C3 will not discharge before GAP1 breaks down. To perform this optional, enhanced function, only one of these secondary spark gaps (either GAP2 or GAP3) need be provided.

Figure 25:
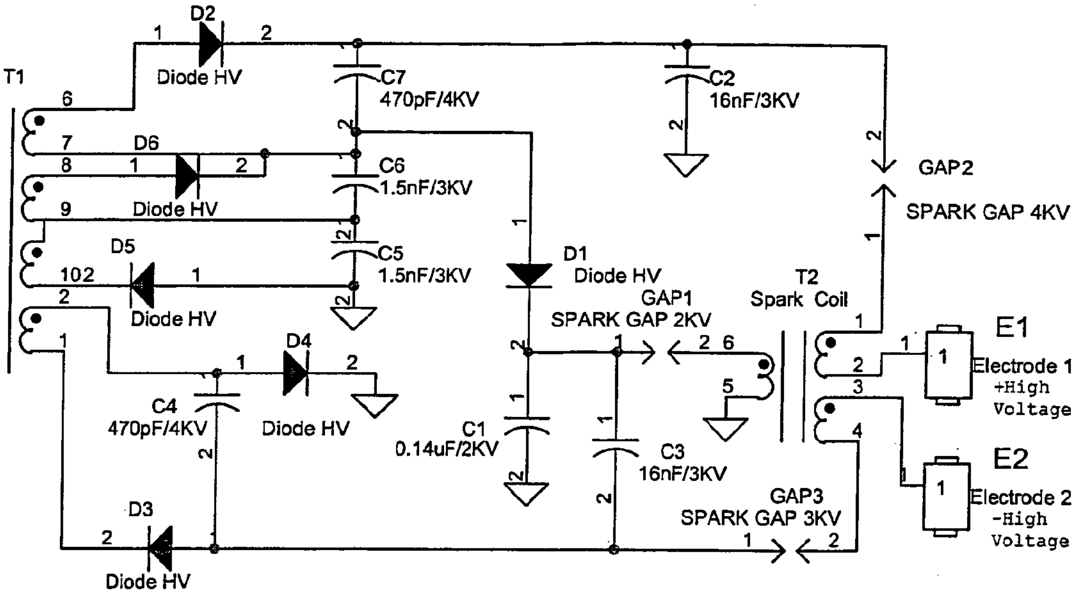
FIG. 25 represents an alternative embodiment of the portion of the power supply illustrated in FIG. 24.

FIG. 25 illustrates a high voltage section with significantly improved efficiency. Instead of rectifying the T1 high voltage transformer outputs through diodes directly to very high voltages, as is the case with the FIG. 24 circuit, transformer T1 has been reconfigured to provide three series-connected secondary windings (windings 6-7, 8-9 and 9-10) where the design output voltage of each winding has been limited to about one thousand volts.

In the FIG. 24 circuit, capacitor C1 is charged directly up to two thousand volts by transformer winding 3-4 and diode D1. In the FIG. 25 circuit, C1 is charged by combining the voltages across C5 and C6. Each T1 transformer winding coupled to charge C5 and C6 is designed to charge each capacitor to one thousand volts, rather than to two thousand volts as in the FIG. 24 circuit.

Since the losses due to parasitic circuit capacitances are a function of the transformer AC output voltage squared, the losses due to parasitic circuit capacitances with the FIG. 25 one thousand volt output voltage compared to the FIG. 24 two thousand volt transformer output voltage are reduced by a factor of four. Furthermore, in the FIG. 25 embodiment, the current required to charge C2 is derived in part from capacitor C6, the positive side of which is charged to 2 KV. Hence, to charge C2 to 3 KV, the voltage across transformer winding pins 6 to 7 is reduced to only 1 KV in comparison to the 3 KV level produced across transformer T1 winding 1-2 in the FIG. 24 circuit.

Another benefit of the novel FIG. 24 and FIG. 25 circuit designs relates to the interaction of C1 to C3. Just before GAP1 breaks down, the charge on C1 is 2 KV while the charge on C3 is 3 KV. After C1 has discharged and the output current is being supported by C2 and C3, the voltage across C3 remains at 3 KV. However, since the positive side of C3 is now at ground level, the negative terminal of C3 will be at −3 KV. Hence a differential voltage of 6 KV has been created between the positive terminal of C2 and the negative terminal of C3. During the time interval when C2 and C3 discharge after C1 has been discharged, the T2 output windings merely act as conductors.

The X26 system trigger position is read by the microprocessor which may be programmed to extend the duration of the operating cycle in response to additional trigger pulls. Each time the trigger is pulled, the microprocessor senses that event and activates a fixed time period operating cycle. After the gun has been activated, the Central Information Display (CID) 14 on the back of the X26 handle indicates how much longer the X26 system will remain activated. The X26 system activation period may be preset to yield a fixed operating time, for example five seconds. Alternatively, the activation period may be programmed to be extended in increments in response to additional, sequential trigger pulls. Each time the trigger is pulled, the CID readout 14 will update the countdown timer to the new, longer timeout. The incrementing trigger feature will allow a civilian who uses the X26 system on an aggressive attacker to initiate multiple trigger pulls to activate the gun for a prolonged period, enabling the user to lay the gun down on the ground and get away.

To protect police officers against allegations of stun gun misuse, the X26 system may provide an internal non-volatile memory set aside for logging the time, duration of discharge, internal temperature and battery level each time the weapon is fired.

The stun gun clock time always remains set to GMT. When downloading system data to a computer using the USB interface module, a translation from GMT to local time may be provided. On the displayed data log, both GMT and local time may be shown. Whenever the system clock is reset or reprogrammed, a separate entry may be made in the system log to record such changes.

It will be apparent to those skilled in the art that the disclosed electronic disabling device for generating a time-sequenced, shaped voltage output waveform may be modified in numerous ways and may assume many embodiments other than the preferred forms specifically set out and described above. Accordingly, it is intended by the appended claims to cover all such modifications of the invention which fall within the true spirit and scope of the invention.

We claim:

1. An electronic device having a first high voltage transformer for creating an arc and a second transformer with a lower output voltage to maintain current across the arc to disable a subject.

2. A dual operating mode electronic disabling device for immobilizing a target comprising:

a. first and second electrodes positionable to establish first and second spaced apart contact points on the target wherein a high impedance air gap may exist between at least one of the electrodes and the target; and b. a power supply for operating in a first mode to generate a first high voltage, short duration output across the first and second electrodes during a first time interval to ionize the air within the air gap to thereby reduce the high impedance across the air gap to a lower impedance to enable current flow across the air gap at a lower voltage level and for subsequently operating in a second mode to generate a second lower voltage output across the first and second electrodes during a second time interval to maintain the current flow across the first and second electrodes and between the first and second contact points on the target to enable the current flow through the target to cause involuntary muscle contractions to thereby immobilize the target.

3. A dual operating mode electronic disabling device for immobilizing a target comprising:

a. first and second electrodes positionable to establish first and second spaced apart contact points on the target wherein a high impedance air gap may exist between at least one of the electrodes and the target;

b. a high voltage power supply for generating an output voltage; and c. a high voltage power output circuit which generates a first high voltage output across the first and second electrodes to ionize the air within the air gap thereby reducing the high impedance across the air gap to a lower impedance to enable current flow across the air gap at a lower voltage level and for subsequently enabling a second lower voltage output to cause current to flow across the first and second electrodes and between the first and second contact points on the target allowing current flow through the target thereby producing involuntary muscle contractions and immobilizing the target.

4. A dual operating mode electronic disabling device for immobilizing a target comprising:

a. first and second electrodes positionable to establish first and second spaced apart contact points on the target wherein a high impedance air gap may exist between at least one of the electrodes and the target;

b. a high voltage power supply for generating an output voltage; and c. a switchable output circuit for the high voltage power supply for switching into and operating in a first output circuit configuration to generate a first high voltage output across the first and second electrodes during a first time interval to ionize the air within the air gap and reduce the high impedance across the air gap to a lower impedance to enable current flow across the air gap at a lower voltage level and for subsequently switching into and operating in a second output circuit configuration to generate a second lower voltage output across the first and second electrodes during a second time interval to maintain the current flow across the first and second electrodes and between the first and second contact points on the target allowing current flow through the target thereby producing involuntary muscle contractions and immobilizing the target.

5. The dual operating mode electronic disabling device of claim 4 wherein the switchable output circuit includes:

a. a high voltage output circuit for generating a relatively high voltage output across the first and second electrodes during the first time interval; and b. a low voltage output circuit for generating a relatively low voltage output across the first and second electrodes during the second time interval.

6. The dual operating mode electronic disabling device of claim 4 wherein the high voltage output circuit includes:

a. a first energy storage capacitor;

b. a voltage conversion circuit coupled between the first energy storage capacitor and the first electrode for increasing the energy storage capacitor voltage from a first voltage level to a higher second voltage level; and c. a first switch for closing to couple the high voltage output circuit across the first and second electrodes after the voltage on the first energy storage capacitor reaches a first predetermined level.

7. The dual operating mode electronic disabling device of claim 6 wherein the low voltage output circuit includes:

a. a second energy storage capacitor; and b. a second switch for closing to couple the second energy storage capacitor across the first and second electrodes at about the time that the first high voltage output has ionized the air in the air gap.

8. The dual operating mode electronic disabling device of claim 7 wherein the first energy storage capacitor and the second energy storage capacitor each receive a charging current from the high voltage power supply.

9. The dual operating mode electronic disabling device of claim 8 wherein the first switch opens to disconnect the high voltage output circuit from the first and second electrodes after the second switch closes.

10. The dual operating mode electronic disabling device of claim 9 wherein closure of the first switch defines a time $T_1$.

11. The dual operating mode electronic disabling device of claim 10 wherein closure of the second switch defines a time $T_2$.

12. The dual operating mode electronic disabling device of claim 9 wherein the second switch is configured to open when the second energy storage capacitor voltage falls below a predetermined level and defines a time $T_3$.

13. The dual operating mode electronic disabling device of claim 11 wherein the relationship between the open and closed states of the first and second switches is defined by the following table:

| Time Interval | First Switch | Second Switch |
|---|---|---|
| $T_1$–$T_2$ | Closed | Open |
| $T_2$–$T_3$ | Open or Closed | Closed |

14. The dual operating mode electronic disabling device of claim 13 wherein the first and second switches include voltage activated switches.

15. The dual operating mode electronic disabling device of claim 14 wherein the first and second voltage activated switches include spark gaps and wherein the breakover voltage of the first spark gap is less than the breakover voltage of the second spark gap.

16. The dual operating mode electronic disabling device of claim 12 further including:

a. a trigger switch for activating and deactivating the electronic disabling device; and b. a controller for sensing the configuration of the trigger switch and for controlling the operation of the high voltage power supply.

17. The dual operating mode electronic disabling device of claim 16 wherein closure of the trigger switch defines a time $T_0$ and causes the controller to activate the voltage conversion stage of the high voltage power supply.

18. The dual operating mode electronic disabling device of claim 17 wherein second the controller deactivates the voltage conversion stage of the high voltage power supply at time $T_3$.

19. The dual operating mode electronic disabling device of claim 18 wherein the controller repeatedly activates and deactivates the high voltage power supply to maintain the fixed pulse repetition rate.

20. The dual operating mode electronic disabling device of claim 8 wherein voltage conversion circuit comprises a voltage multiplier.

21. The dual operating mode electronic disabling device of claim 20 wherein the voltage multiplier includes a step-up transformer.

22. The dual operating mode electronic disabling device of claim 21 wherein the step-up transformer includes a primary winding and a secondary winding and wherein the primary winding is coupled in series with the discharge path of the first energy storage capacitor.

23. A dual operating mode electronic disabling device for immobilizing a target comprising:

a. first and second electrodes positionable to establish first and second spaced apart contact points on the target wherein a high impedance air gap may exist between at least one of the electrodes and the target;

b. a high voltage power supply having a voltage conversion stage for receiving a low voltage DC input and for generating at an output terminal a substantially increased DC output voltage;

c. a high voltage output circuit coupled to the voltage conversion stage output terminal for generating a high voltage output across the first and second electrodes during a time interval $T_2$–$T_3$; and d. a low voltage output circuit coupled to the voltage conversion stage output terminal for generating a lower voltage output across the first and second electrodes during a time interval $T_2$–$T_3$.

24. The dual operating mode electronic disabling device of claim 23 wherein:

a. the high voltage output circuit includes a first energy storage capacitor coupled to the output terminal of the high voltage power supply voltage conversion stage for receiving a charging current from the high voltage power supply during a time interval $T_0$–$T_1$; and b. the low voltage output circuit includes a second energy storage capacitor coupled in parallel with the output terminal of the high voltage power supply voltage conversion stage for receiving the charging current from the high voltage power supply during the time interval $T_0$–$T_1$.

25. The dual operating mode electronic disabling device of claim 24 wherein the high voltage output stage further includes:

a. a voltage multiplier coupled between the first energy storage capacitor and the first electrode for increasing the energy storage capacitor voltage to a high voltage level; and b. a first switch for closing to couple the high voltage output circuit across the first and second electrodes when the voltage on the first energy storage capacitor reaches a first predetermined level.

26. The dual operating mode electronic disabling device of claim 25 wherein the low voltage output circuit further includes:

a. a second switch for closing to couple the second energy storage capacitor across the first and second electrodes after the voltage applied by the high voltage output circuit across the first and second electrodes establishes an arc allowing current to flow at a lower voltage.

27. The dual operating mode electronic disabling device of claim 26 wherein the first switch opens to disconnect the high voltage output circuit from the first and second electrodes when the second switch closes.

28. The dual operating mode electronic disabling device of claim 27 wherein the first and second switches include spark gap switches.

29. The dual operating mode electronic disabling device of claim 28 further including:

a. a trigger switch for activating and deactivating the electronic disabling device; and b. a controller for sensing the configuration of the trigger switch and for controlling the operation of the high voltage power supply.

30. The dual operating mode electronic disabling device of claim 29 wherein the voltage multiplier comprises a step-up transformer.

31. A method for selectively operating an electronic disabling device in first and second modes to immobilize a target, comprising the steps of:

a. simultaneously directing a charging current to first and second energy storage capacitors during a first time interval;

b. sensing the voltage on the first energy storage capacitor and connecting the first energy storage capacitor to a voltage multiplier when the first energy storage capacitor voltage exceeds a first voltage threshold;

c. discharging the first energy storage capacitor through the voltage multiplier during a second time interval to generate a multiplied output voltage across first and second output electrodes while positioning the output electrodes in proximity to the target to establish first and second spaced apart intended contact points on the target wherein a high impedance air gap may exist between at least one of the electrodes and the target;

d. establishing a current flow between the first and second electrodes to create a reduced impedance ionized pathway across the air gap to thereby reduce the high impedance previously existing across the air gap to a substantially lower impedance; and e. sensing the voltage applied across the first and second electrodes as the first energy storage capacitor is discharging and connecting the second energy storage capacitor across the first and second electrodes to discharge current through the reduced impedance ionized pathway established across the air gap to maintain the current flow between the first and second electrodes during a third time interval.

32. The method of claim 31 wherein the first and second energy storage capacitors are charged to substantially equal voltage levels during the first time interval.

33. The method of claim 31 wherein the voltage multiplier includes a step-up transformer having primary and secondary windings and wherein the discharge current from the first energy storage capacitor passes through the primary transformer winding.

34. The method of claim 31 wherein the multiplied output voltage generated during the second time interval substantially exceeds the first voltage level.

35. The method of claim 31 wherein the duration of the second time interval is substantially shorter than the duration of the third time interval.

36. The method of claim 35 wherein the step of sensing the voltage on the first energy storage capacitor is performed by a first spark gap having a first breakdown voltage substantially equal to the first voltage threshold.

37. The method of claim 31 wherein the target is a remote target further including first and second darts coupled by separate lengths of flexible wire to the first and second output electrodes, the wire length being sufficient to span the distance between the output electrodes and the remote target.

38. The method of claim 37 including the further step of propelling the darts from a first location in proximity to the output electrodes toward the remote target.

39. The method of claim 38 wherein the first and second darts include electrically conductive tips coupled to the separate lengths of flexible wire.

40. A method for immobilizing the muscles of a target, comprising the steps of:

a. providing first and second electrodes positionable to establish first and second spaced apart contact points on the target wherein a high impedance air gap may exist between at least one of the electrodes and the target;

b. applying a first high voltage, short duration output across the first and second electrodes during a first time interval to ionize the air within the air gap to thereby reduce the high impedance across the air gap to a lower impedance to enable current to flow across the air gap at a lower voltage level; and c. subsequently applying a second lower voltage output across the first and second electrodes during a second time interval to maintain the current flow across the first and second electrodes and between the first and second contact points on the target to enable the current flow through the target to cause involuntary muscle contractions to thereby immobilize the target.

* * * * *

US006999295C1

(12) EX PARTE REEXAMINATION CERTIFICATE (8363rd)

United States Patent (10) Number: US 6,999,295 C1
Watkins, III et al. (45) Certificate Issued: Jun. 28, 2011

(54) DUAL OPERATING MODE ELECTRONIC DISABLING DEVICE FOR GENERATING A TIME SEQUENCE SHAPED VOLTAGE OUTPUT WAVEFORM

(75) Inventors: Thomas G. Watkins, III, Phoenix, AZ (US); Magne Nerheim, Scottsdale, AZ (US)

(73) Assignee: Taser International, Inc., Scottsdale, AZ (US)

Reexamination Request:
No. 90/009,835, Nov. 29, 2010

Reexamination Certificate for:
Patent No.: 6,999,295
Issued: Feb. 14, 2006
Appl. No.: 11/051,877
Filed: Feb. 5, 2005

Related U.S. Application Data

(63) Continuation of application No. 10/447,447, filed on May 29, 2003, now Pat. No. 7,102,870, which is a continuation-in-part of application No. 10/364,164, filed on Feb. 11, 2003, now Pat. No. 7,145,762.

(51) Int. Cl.
*H01T 23/00* (2006.01)

(52) U.S. Cl. ........................................................ 361/232

(58) Field of Classification Search ........................ None
See application file for complete search history.

(56) References Cited

U.S. PATENT DOCUMENTS

| | | | |
|---|---|---|---|
| 2,805,067 | A | 9/1957 | Ryan |
| 2,896,123 | A | 7/1959 | McNulty |
| 3,223,887 | A | 12/1965 | Brown |
| 3,295,528 | A | 1/1967 | Masaki |
| 3,376,470 | A | 4/1968 | Stone |
| 3,450,942 | A | 6/1969 | Segall |
| 3,523,538 | A | 8/1970 | Shimizu |
| 3,569,727 | A | 3/1971 | Aggarwal |
| 3,584,929 | A | 6/1971 | Schuette |
| 3,626,626 | A | 12/1971 | Blanc |
| 3,629,652 | A | 12/1971 | Maycock |
| 3,717,802 | A | 2/1973 | Plevy |
| 3,803,463 | A | 4/1974 | Cover |
| 3,819,108 | A | 6/1974 | Jordan |
| 3,869,645 | A | 3/1975 | Collins |
| 3,917,268 | A | 11/1975 | Tingey |
| 3,958,168 | A | 5/1976 | Grundberg |
| 3,972,315 | A | 8/1976 | Munden |
| 4,004,561 | A | 1/1977 | Thieme |
| 4,027,198 | A | 5/1977 | Linkroum |

(Continued)

FOREIGN PATENT DOCUMENTS

| | | |
|---|---|---|
| EP | 228840 | 7/1991 |
| FR | 2317804 | 2/1977 |
| GB | 1109052 | 4/1968 |
| GB | 1239756 | 7/1971 |
| GB | 2085523 | 4/1982 |
| KR | 20-1992-0010198 | 6/1992 |
| KR | 20-1994-0001616 | 1/1994 |
| KR | 20-1996-0001673 | 2/1996 |
| KR | 10-1998-072970 | 11/1998 |
| WO | WO-98/11399 | 3/1998 |
| WO | WO-PCT/EP01/04862 | 11/2001 |

*Primary Examiner*—Albert J Gagliardi

(57) ABSTRACT

An electronic disabling device includes first and second electrodes positionable to establish first and second spaced apart contact points on a target having a high impedance air gap existing between at least one of the electrodes and the target. The power supply generates a first high voltage, short duration output across the first and second electrodes during a first time interval to ionize air within the air gap to thereby reduce the high impedance across the air gap to a lower impedance to enable current flow across the air gap at a lower voltage level. The power supply next generates a second lower voltage, longer duration output across the first and second electrodes during a second time interval to maintain the current flow across the first and second electrodes and between the first and second contact points on the target to enable the current flow through the target to cause involuntary muscle contractions to thereby immobilize the target.

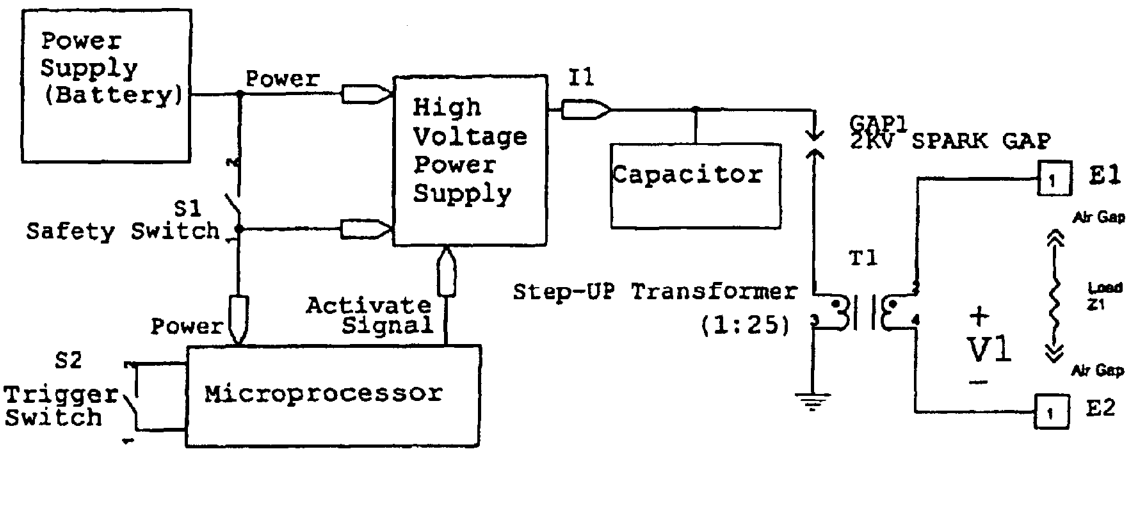

U.S. PATENT DOCUMENTS

| | | | |
|---|---|---|---|
| 4,040,425 | A | 8/1977 | Goodling |
| 4,092,695 | A | 5/1978 | Henderson |
| 4,120,305 | A | 10/1978 | Rhoads et al. |
| 4,129,895 | A | 12/1978 | Witting |
| 4,154,205 | A | 5/1979 | Forster |
| 4,162,515 | A | 7/1979 | Henderson |
| 4,167,036 | A | 9/1979 | Kenney |
| 4,220,443 | A | 9/1980 | Bear |
| 4,228,405 | A | 10/1980 | Rhoads |
| 4,242,715 | A | 12/1980 | Laird |
| 4,253,132 | A | 2/1981 | Cover |
| 4,370,696 | A | 1/1983 | Darrell |
| 4,486,807 | A | 12/1984 | Yanez |
| 4,510,915 | A | 4/1985 | Ishikawa |
| 4,539,937 | A | 9/1985 | Workman |
| 4,541,191 | A | 9/1985 | Morris |
| 4,541,848 | A | 9/1985 | Masuda |
| 4,589,398 | A | 5/1986 | Pate |
| 4,613,797 | A | 9/1986 | Eggers |
| 4,688,140 | A | 8/1987 | Hammes |
| 4,691,264 | A | 9/1987 | Schaffhauser |
| 4,755,723 | A | 7/1988 | Sikora |
| 4,843,336 | A | 6/1989 | Kuo |
| 4,846,044 | A | 7/1989 | Lahr |
| 4,859,868 | A | 8/1989 | McKissack |
| 4,872,084 | A | 10/1989 | Dunning |
| 4,884,809 | A | 12/1989 | Rowan |
| 4,900,990 | A | 2/1990 | Sikora |
| 4,949,017 | A | 8/1990 | Sikora |
| 5,060,131 | A | 10/1991 | Sikora |
| 5,078,117 | A | 1/1992 | Cover |
| 5,163,411 | A | 11/1992 | Koiwa |
| 5,178,120 | A | 1/1993 | Howson |
| 5,193,048 | A | 3/1993 | Kaufman |
| 5,215,066 | A | 6/1993 | Narishige |
| 5,225,623 | A | 7/1993 | Krasnow |
| 5,282,332 | A | 2/1994 | Philips |
| 5,317,155 | A | 5/1994 | King |
| 5,388,603 | A | 2/1995 | Bauer |
| 5,467,247 | A | 11/1995 | de Anda |
| 5,471,362 | A | 11/1995 | Gowan |
| 5,473,501 | A | 12/1995 | Claypool |
| 5,519,389 | A | 5/1996 | DeGunther |
| 5,523,654 | A | 6/1996 | Sikora |
| 5,537,771 | A | 7/1996 | Martin |
| 5,571,362 | A | 11/1996 | Gowan |
| 5,592,095 | A | 1/1997 | Meadows |
| 5,619,402 | A | 4/1997 | Liu |
| 5,625,525 | A | 4/1997 | Coakley |
| 5,627,453 | A | 5/1997 | Sheehan |
| 5,654,868 | A | 8/1997 | Buer |
| 5,698,815 | A | 12/1997 | Ragner |
| 5,754,011 | A | 5/1998 | Frus |
| 5,755,056 | A | 5/1998 | Danner |
| 5,799,433 | A | 9/1998 | Danner |
| 5,891,172 | A | 4/1999 | Stendahl |
| 5,915,936 | A | 6/1999 | Brentzel |
| 5,925,983 | A | 7/1999 | Toda |
| 5,962,806 | A | 10/1999 | Coakley |
| 5,973,477 | A | 10/1999 | Chang |
| 5,988,036 | A | 11/1999 | Mangolds |
| 6,022,120 | A | 2/2000 | Chang |
| 6,204,476 | B1 | 3/2001 | Reynolds |
| 6,237,461 | B1 | 5/2001 | Poole |
| 6,286,242 | B1 | 9/2001 | Klebes |
| 6,404,613 | B1 | 6/2002 | Dowling |
| 6,408,905 | B1 | 6/2002 | Lee |
| 6,479,909 | B1 | 11/2002 | Hamm |
| 6,549,014 | B1 | 4/2003 | Kutkut |
| 6,636,412 | B2 | 10/2003 | Smith |
| 6,643,114 | B2 | 11/2003 | Stethem |
| 6,679,180 | B2 | 1/2004 | Warnagiris |
| 6,791,816 | B2 | 9/2004 | Stethem |
| 6,823,621 | B2 | 11/2004 | Gotfried |
| 6,856,238 | B2 | 2/2005 | Wootton |
| 6,862,994 | B2 | 3/2005 | Chang |
| 6,877,434 | B1 | 4/2005 | McNulty |
| RE38,794 | E | 9/2005 | Danner |
| 7,012,797 | B1 | 3/2006 | Delida |
| 7,047,885 | B1 | 5/2006 | Crickenberger |
| 7,075,770 | B1 | 7/2006 | Smith |
| 7,102,870 | B2 | 9/2006 | Nerheim |
| 7,145,762 | B2 | 12/2006 | Nerheim |
| 7,174,668 | B2 | 2/2007 | Locklear |
| 7,280,340 | B2 | 10/2007 | Smith |
| 7,570,476 | B2 | 8/2009 | Nerheim |
| 7,580,237 | B2 | 8/2009 | Nerheim |
| 7,602,598 | B2 | 10/2009 | Nerheim |
| 7,782,592 | B2 | 8/2010 | Nerheim |
| 7,800,885 | B2 | 9/2010 | Brundula |
| 7,916,446 | B2 | 3/2011 | Nerheim |
| 2001/0032405 | A1 | 10/2001 | Kaminski |
| 2007/0019358 | A1 | 1/2007 | Kroll |
| 2011/0043961 | A1 | 2/2011 | Nerheim |
| 2011/0050177 | A1 | 3/2011 | Nerheim |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-40 is confirmed.

* * * * *